(12) United States Patent
Esch

(10) Patent No.: US 11,494,357 B1
(45) Date of Patent: Nov. 8, 2022

(54) DIRECTED ACYCLIC GRAPH PATH ADDRESSING

(71) Applicant: Practical Posets LLC, Minneapolis, MN (US)

(72) Inventor: John W. Esch, Burnsville, MN (US)

(73) Assignee: Practical Posets LLC, Minneapolis, MN (US)

( * ) Notice: Subject to any disclaimer, the term of this patent is extended or adjusted under 35 U.S.C. 154(b) by 0 days.

(21) Appl. No.: 17/387,124

(22) Filed: Jul. 28, 2021

(51) Int. Cl.
*G06F 16/28* (2019.01)
*G06F 16/22* (2019.01)

(52) U.S. Cl.
CPC ...... *G06F 16/2246* (2019.01); *G06F 16/2237* (2019.01); *G06F 16/288* (2019.01)

(58) Field of Classification Search
CPC .......................... G06F 16/2246; G06F 16/288
See application file for complete search history.

(56) References Cited

U.S. PATENT DOCUMENTS

| | | | | |
|---|---|---|---|---|
| 7,197,573 B1* | 3/2007 | Jacobson | ................ | H04L 45/38 709/239 |
| 9,904,528 B1* | 2/2018 | Ireland | .................... | G06F 8/315 |
| 11,044,682 B1* | 6/2021 | Thubert | ............. | H04W 52/322 |
| 2007/0230488 A1* | 10/2007 | Yu | ........................... | H04L 45/48 370/408 |
| 2013/0024586 A1* | 1/2013 | Coronado | .......... | G06F 11/2247 710/104 |
| 2015/0052331 A1* | 2/2015 | Dhurjati | ................... | G06F 8/44 712/30 |
| 2015/0170316 A1* | 6/2015 | Balmin | ................... | G06F 17/10 345/503 |
| 2017/0287198 A1* | 10/2017 | Feng | ..................... | G06T 17/005 |
| 2017/0364534 A1 | 12/2017 | Zhang et al. | | |
| 2020/0053026 A1* | 2/2020 | Rangachari | ............. | H04L 45/44 |
| 2020/0210398 A1* | 7/2020 | Liu | ........................ | G06F 16/284 |
| 2021/0004374 A1* | 1/2021 | Xia | ................... | G06F 16/24549 |
| 2021/0191919 A1* | 6/2021 | Perkov | ................ | G06F 16/2365 |

(Continued)

OTHER PUBLICATIONS

Yu, Jeffrey Xu, and Jiefeng Cheng "Graph Reachability Queries: A Survey." Managing and Mining Graph Data (pp. 181-215). Springer, Boston, MA, 2010. 181-215 (Year: 2010).

(Continued)

*Primary Examiner* — James Trujillo
*Assistant Examiner* — Michal Bogacki
(74) *Attorney, Agent, or Firm* — Fredrikson & Byron, P.A.

(57) ABSTRACT

A memory for storing a directed acyclic graph (DAG) for access by an application being executed by one or more processors of a computing device is described. The DAG includes a plurality of nodes, wherein each node represents a data point within the DAG. The DAG further includes a plurality of directional edges. Each directional edge connects a pair of the nodes and represents a covering-covered relationship between two nodes (a covering node and a covered node). Each node comprises a subgraph consisting of the respective node and all other nodes reachable via a covering path that comprises a sequence of covering and covered nodes. Nodes present in the subgraph that do not cover any other nodes are leaves of the subgraph. Each node comprises a set of node parameters including at least an identifier and an address range. Each node and the legal address specify a cover path.

16 Claims, 26 Drawing Sheets

Leaf Addressing 300

Subgraph Addressing 350

(56) References Cited

U.S. PATENT DOCUMENTS

2021/0314290 A1* 10/2021 Thubert ............... H04L 67/12
2022/0101648 A1* 3/2022 Blanchon ........... G06V 40/1347

OTHER PUBLICATIONS

Xue, Peng, et al. "A Reachability Query Approach with Path Interval Labeling." 2014 11th Web Information System and Application Conference (pp. 172-177). IEEE, 2014 (Year: 2014).

Li, Fangxu, et al. "Interval-index: A scalable and Fast Approach for Reachability Queries in Large Graphs." International Conference on Knowledge Science, Engineering and Management (pp. 224-235). Springer, Cham, 2015. (Year: 2015).

Yildirim, Hilmi. "Scalable Reachability Indexing for Very Large Graphs." UMI No. 3514789 Rensselaer Polytechnic Institute, Retrieved Jan. 27, 2021 from https://dialog.proquest.com/professional/docview/1022175652?accountid=131444, Aug. 2011.

* cited by examiner

| Node 1 Address | Output PathList |
|---|---|
| 1 | 1 |
| 2 | 1 2 |
| 3 | 1 2 4 |
| 4 | 1 2 4 7 |
| 5 | 1 2 5 |
| 6 | 1 2 5 8 |
| 7 | 1 2 6 |
| 8 | 1 2 6 8 |
| 9 | 1 3 |
| 10 | 1 3 8 |

Table 700

FIG. 7

DAG 800

DAG 1300

DIRECTED ACYCLIC GRAPH PATH ADDRESSING

BACKGROUND

Directed acrylic graphs (DAGs) are typically drawn with root nodes at the top of the diagram, directed arcs emanating from roots downward to interior nodes with arrow heads on the ends of the arcs at the interior node, directed arcs from interior nodes down to other interior nodes or leaf nodes, and leaf nodes at the bottom. Root nodes have no arcs pointing to them and leaf nodes have no arcs emanating from them. Other common terminology is for each arc to be from a covering to a covered node or from a parent to a child node.

A cover path extends from an initial node to a node that it covers and, optionally, from the covered node, iteratively, to some other covered node in the DAG, which is also referred to as the final node. A node's subgraph consists of the node and all other nodes of the DAG that can be reached by a cover path from the node.

If a DAG has a single root, then the DAG and the root's subgraph are the same. However, if the DAG has multiple roots, there is a different subgraph for each root and no subgraph that corresponds to the whole DAG.

SUMMARY

Examples described herein generally relate to addressing from one node in a directed acyclic graph (DAG) to other nodes in that node's covered subgraph. While the techniques described herein are generally described with relation to DAGs, these techniques equally apply to partially ordered sets (POSETs), which may be the mathematical equivalent of DAGs. In DAG path addressing, each node may have its own address range.

Providing such address ranges for nodes of a DAG has multiple benefits. When storing and processing a hierarchy of parts lists (PLs) represented as a DAG, it is a problem to refer to instances of a part type corresponding to a node in the DAG. DAG path addressing in accordance with the techniques described herein provide a way to reference those instances and correlate those instances with the parts or subsystem containing them.

Additionally, when storing and processing data-flow diagrams (DFDs), it is a problem that the description of DFDs using the universal modeling language (UML) requires the use of many variable names. This limits the efficiency of both the storage and processing of those stored DFDs. DAG path addressing solves this problem by allowing names to be factored out of the represented DFDs. In the factored form, a DAG path address for each name factored can be added to a binding list along with the DAG path address for where in the DFD the name originally occurred. Being able to factor names in this way allows the DFD to be simpler and used with different sets of names or values, and further allows processing to be done relative to the simpler DFD independent of the names or values.

Further, when storing and processing conceptual graphs (CGs), it is a problem that the description of CGs using the conceptual graph interchange format (CGIF) language requires the use of many variable names. This limits the efficiency of both the storage and processing of those stored CGs. DAG path addressing solves this problem by allowing names to be factored out of the represented CGs. In the factored form, a DAG path address for each name factored can be added to a binding list along with the DAG path address for where in the CG the name originally occurred. Being able to factor names in this way allows the CG to be simpler and used with different sets of name binding lists, and also allows processing to be done relative to the simpler CG independent of the names.

In one example, the disclosure is directed to a memory for storing a directed acyclic graph (DAG) for access by an application being executed by one or more processors of a computing device. The DAG includes a plurality of nodes stored in the memory, wherein each node of the plurality of nodes represents a data point within the DAG. The DAG further includes a plurality of directional edges stored in the memory. Each directional edge of the plurality of directional edges connects a pair of the nodes in the plurality of nodes, wherein each directional edge of the plurality of directional edges represents a covering-covered relationship between two nodes of the plurality of nodes. A first node of the two nodes comprises a covering node, and a second node of the two nodes comprises a covered node. Each node of the plurality of nodes further comprises a subgraph consisting of the respective node and all other nodes of the plurality of nodes reachable from the respective node via a covering path, wherein the covering path comprises a sequence of covering nodes and covered nodes, and wherein a set of nodes present in the subgraph that do not cover any other nodes are leaves of the subgraph. Each node of the plurality of nodes further comprises a set of node parameters, the set of node parameters including at least an identifier that uniquely identifies the respective node within the DAG, and an address range which specifies legal addresses for the respective node. Each node of the plurality of nodes and each legal address for each respective node specify a cover path within the subgraph for the respective node.

In another example, the disclosure is directed to techniques for generating, managing, and utilizing DAGs addressed in accordance with the techniques described herein.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

The following drawings are illustrative of particular examples of the invention and therefore do not limit the scope of the invention. The drawings are not necessarily to scale (unless so stated) and are intended for use with the explanations in the following detailed description. Examples of the invention will hereinafter be described in conjunction with the appended drawings, wherein like numerals denote like elements.

FIG. 7 is an informational diagram illustrating an example table produced using the method of FIG. 6, in accordance with one or more techniques of this disclosure.

DETAILED DESCRIPTION

The following detailed description is exemplary in nature and is not intended to limit the scope, applicability, or configuration of the invention in any way. Rather, the following description provides some practical illustrations for implementing various examples of the present invention. Those skilled in the art will recognize that many of the noted examples have a variety of suitable alternatives.

Figure 1:
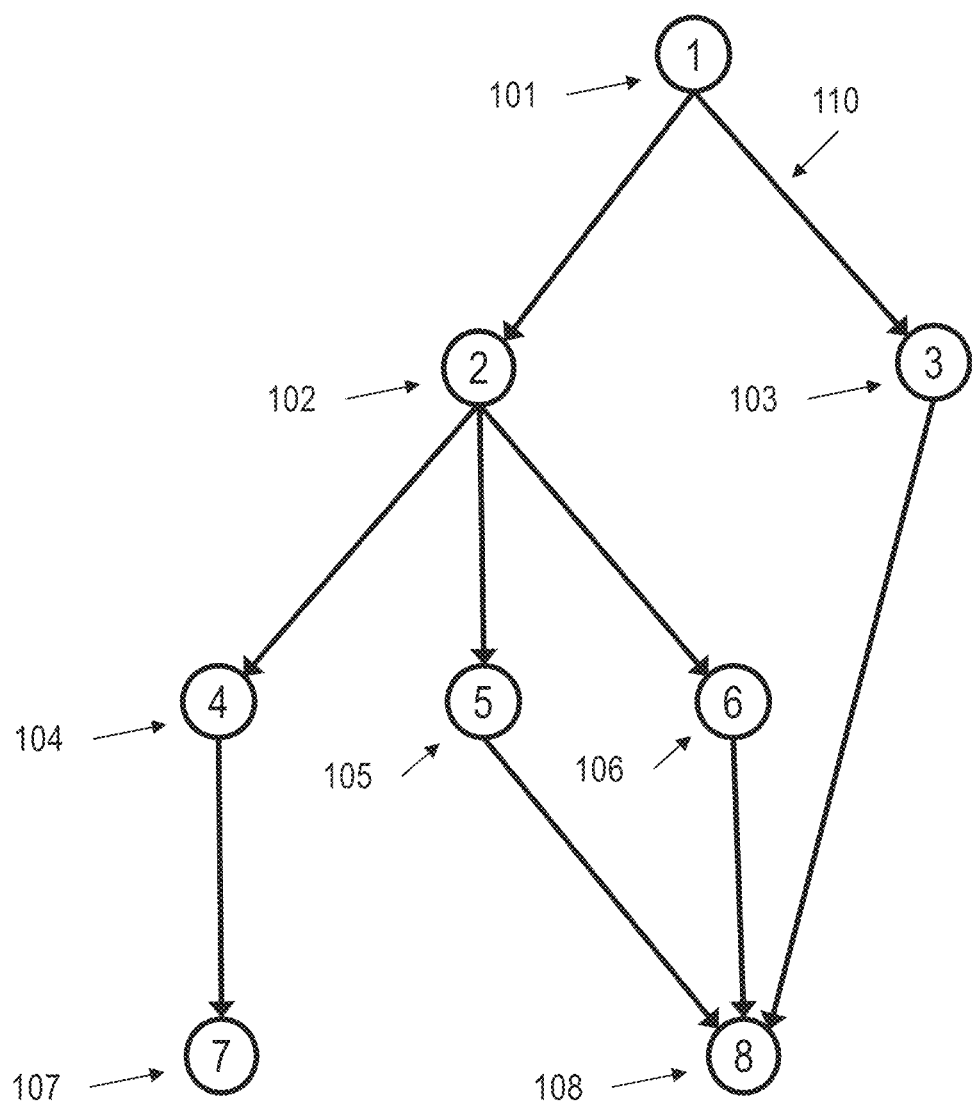
FIG. 1 is a conceptual diagram illustrating an example directed acyclic graph (DAG), in accordance with one or more techniques of this disclosure.

FIG. 1 is a conceptual diagram illustrating an example directed acyclic graph (DAG), in accordance with one or more techniques of this disclosure. FIG. 1 illustrates DAG 100. DAG 100 has root node 101, leaf nodes 107 and 108, and interior nodes 102, 103, 104, 105, and 106. There is a directed arc from node 101 to node 103 labeled 110. The path 101-to-102-to-105-to-108 is a cover path. Node 102 has a subgraph that includes nodes 102, 104, 105, 106, 107, and 108.

Root and interior nodes typically have multiple arcs emanating from them. Interior and leaf nodes often can have multiple arcs pointing to them. When the leaf nodes do not have multiple arcs pointing to them, the DAG is a tree structure. When the leaf nodes do have multiple arcs pointing to them, the DAG is a network structure. DAG 100 is a network structure because node 108 is covered by nodes 103, 105, and 106.

Figure 2:
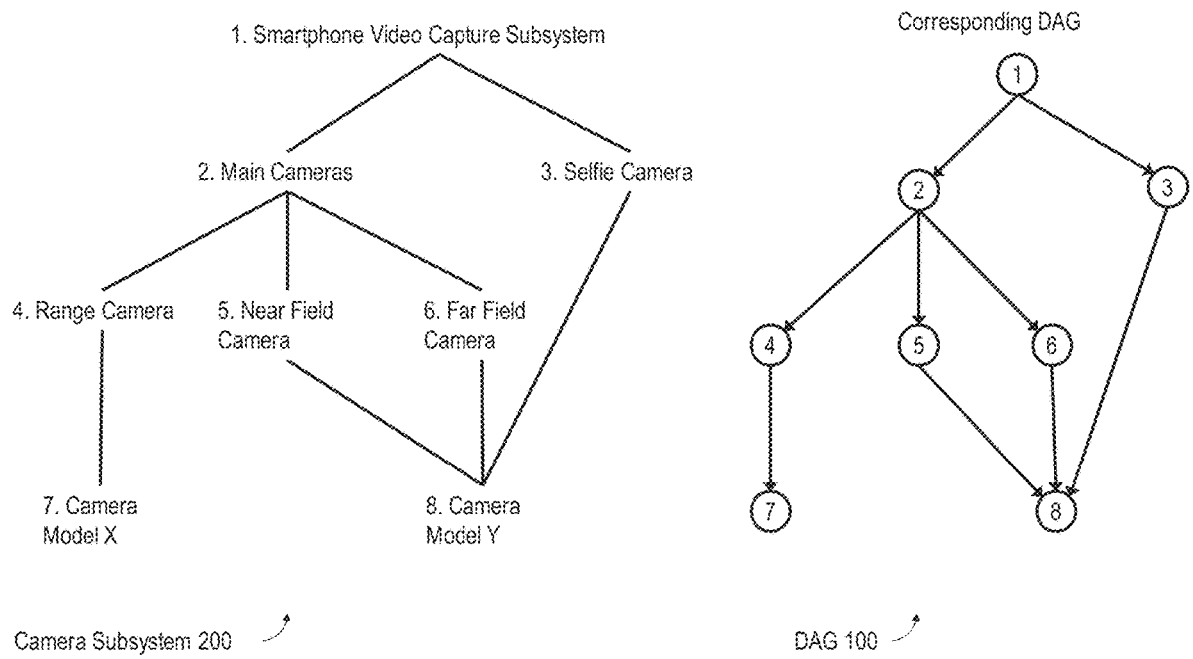
FIG. 2 is a conceptual diagram illustrating example camera parts and a corresponding DAG, in accordance with one or more techniques of this disclosure.

FIG. 2 is a conceptual diagram illustrating example camera parts and a corresponding DAG, in accordance with one or more techniques of this disclosure. Newer smartphones are an example of a parts structure that can be represented by a DAG, as illustrated in FIG. 2. Smartphones typically have multiple cameras that could be of the same kind (e.g., for taking photo of others or of self) or of different kinds (e.g., for infrared distancing). FIG. 2 illustrates camera subsystem 200 as a network of parts. DAG 100 is repeated in FIG. 2 to show how applications, like parts structures, can be represented by DAGs.

If given either the camera subsystem 200 or its corresponding DAG 100, reference is to be made to one of the nodes, node numbers may be used. For example, one can refer to the Camera Model Y by simply using its corresponding node number "8". However, if reference is to be made to the instance of the Camera Model Y used for the Near Field camera, there is a problem.

A solution is to use DAG path addressing where each node has its own address range. This disclosure describes three kinds of path addressing: Leaf Addressing, Subgraph Addressing, and Binding Addressing.

Figure 3:
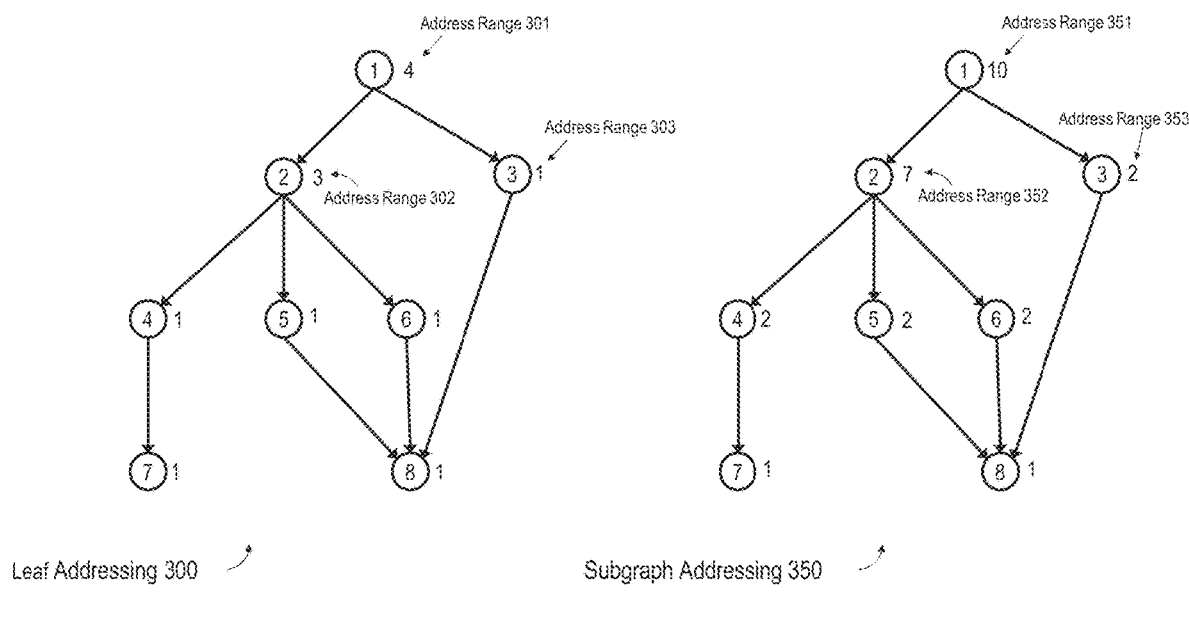
FIG. 3 is a conceptual diagram illustrating an example DAG with path address ranges, in accordance with one or more techniques of this disclosure.

FIG. 3 is a conceptual diagram illustrating an example DAG with path address ranges, in accordance with one or more techniques of this disclosure. The simplest form of DAG path addressing is leaf addressing where only leaf nodes need to be addressed. Each node may have an address range the same size as the number of distinct paths in the node's subgraph to leaf nodes. For leaf addressing, the address range for a node is the sum of the address ranges of that node's covered nodes. FIG. 3 illustrates leaf addressing 300 where the address ranges are shown to the right of the nodes. The address range for node 1 is 4, labeled address range 301. Node 1's covered nodes are nodes 2 and 3. The address ranges for nodes 2 and 3, respectively, are 3 and 1 with sum 4. The address ranges are labeled address range 302 and address range 303.

Address range 301 of 4 indicates that there are 4 legal addresses for node 1 and each follows a different path to a leaf node. Similarly, address range 302 is 3, indicating that node 2 has 3 legal addresses and that each follows a different path to a leaf node. The address range for nodes 3, 4, 5, and 6 is 1, indicating that each of these nodes have only 1 path to a leaf node.

Nodes 7 and 8 are leaf nodes and are different. A leaf node's address range may be 1 so its value can be used to compute the address range for covering nodes. Since nodes 7 and 8 are leaf nodes, nodes 7 and 8 do not have any legal addresses since there are no cover paths to a leaf node.

Figure 4:
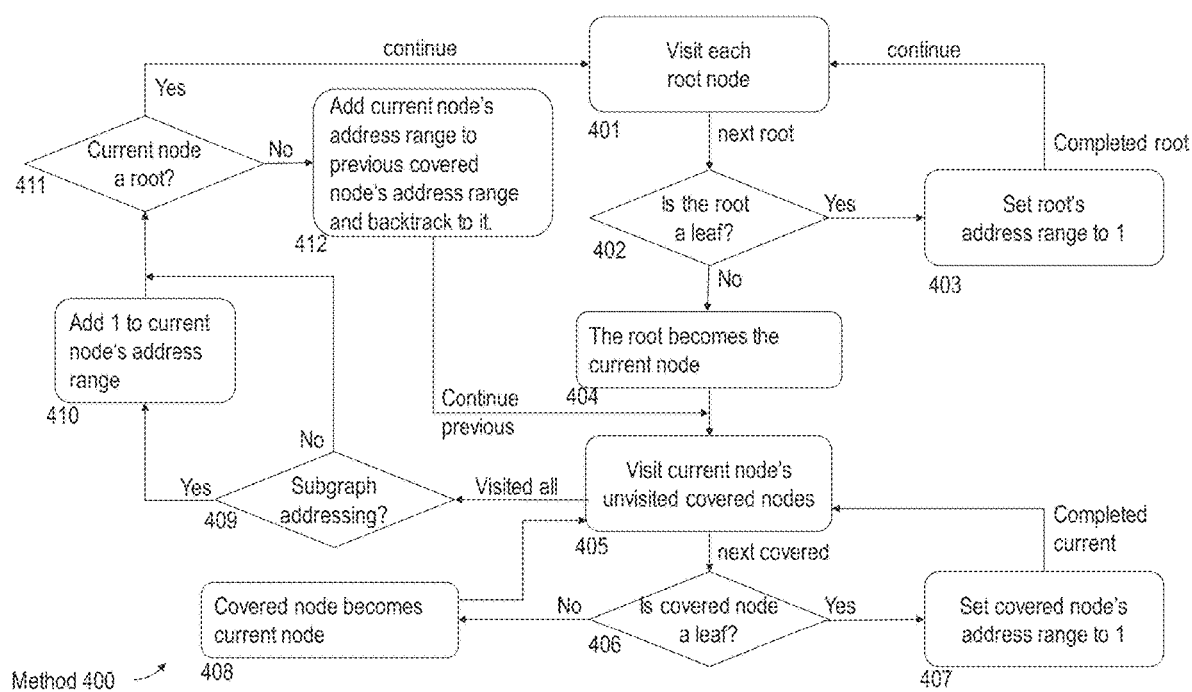
FIG. 4 is a flow diagram illustrating an example method for address range generation, in accordance with one or more techniques of this disclosure.

FIG. 4 is a flow diagram illustrating an example method for address range generation, in accordance with one or more techniques of this disclosure. Method 400 may be performed by a processor during the execution of an application, such as processors 240 and application 220 of FIG. 26. As such, "steps" of the method indicate that a processor may be performing the techniques described with respect to that step. Method 400 uses recursive descent to visit all of a DAG's nodes and compute their address ranges. To compute the address range for a node in a DAG, Method 400 adds up the address ranges of each of that node's covered nodes.

Step 401 processes each root node of the DAG in turn. When all have been processed, Method 400 is complete because all nodes of the DAG have had address ranges computed for them. Step 402 tests if the current root is a leaf or not. If the current root is a leaf node (step 402 Yes), then step 403 sets the current root address range to 1. If not, (step 402 No), step 404 makes the current root the current node.

Step 405 manages the recursive descent along directed arcs of the DAG to the current node's covered nodes. If the current node has been visited before, the current node has already had its address range set; and so, step 405 only loops over covered nodes that have not been visited before.

Since step 402 tests if a root node is a leaf, step 405 may find at least one covered node for roots passed to it.

Step 405 processes each of the current node's covered nodes by passing the next covered node to step 406. Step 406 tests if the covered node is a leaf node or not. If the covered node is a leaf node (step 406 Yes), step 407 sets the covered node's address range to 1 and returns to step 405 where the processor moves to the next covered node. If the covered node is not a leaf node (step 406 No), step 408 causes the recursive descent by making the covered node the current node and returning to step 405.

The recursive descent eventually gets to each leaf as the current node and step 405, consequently, determines that all covered nodes (since there are none for a leaf) have been visited and passes execution to step 409. Step 409 tests if Method 400 is generating address ranges for leaf addressing or subgraph addressing, which is discussed after Method 400 is described. If Method 400 is doing subgraph addressing, step 410 adds 1 to the current node's address range for that node.

Step 411 tests if the current node is a root or not. If the current node is a root (step 411 Yes), execution returns to step 401. If the current node is not a root (step 411 No), execution goes to step 412. Step 412 is the primary backtrack step of the recursive descent. Step 412 adds the current node's address range to the previous node's address range. There may be a previous node since the current node is not a root because of step 411. After adding to the previous node's address range, step 412 backtracks to that previous node and returns execution to step 405.

The following table shows how the various instances of cameras each have their own distinct DAG path address from node 1, the root of the parts hierarchy.

| Camera Type | Camera Instance | DAG path address |
| --- | --- | --- |
| Camera Model X | Range Camera | 1 |
| Camera Model Y | Near Field Camera | 2 |
| Camera Model Y | Far Field Camera | 3 |
| Camera Model Y | Selfie Camera | 4 |

A variation of leaf addressing is where an application provides a Boolean function that takes a DAG node as a parameter and produces a True or False for whether the node is to be considered a leaf or not. For large, complex DAGs, this allows for the application to distinguish interior nodes as leaves as needed. For example, if a DAG (POSET) has generators, then the Boolean function could return true if the node corresponds to a generator or not. In that case, each address corresponds to a distinct path to a generator.

In FIG. 4, steps 409 and 410 allows Method 400 to be used to compute address ranges for both leaf addressing and subgraph addressing. If all nodes (not just leaves) in each node's subgraph need to be addressed, then subgraph addressing is needed. To allow all nodes in a subgraph to be addressed, each node's address range is increased by one to provide an address for the node itself. The corresponding address range values are shown in FIG. 3 subgraph addressing 350.

In subgraph addressing, node 1's address range is 10. This indicates that node 1 has 10 legal addresses where each one of those addresses denotes itself or a path to a leaf node or some other node along the way. Similarly, node 2's address range is 7, indicating that node 2 has 7 legal addresses to itself and along a different path to a leaf node or some other node along the way. The address range for each of nodes 3, 4, 5, and 6 is 2, indicating that these nodes each can address themselves and a covered leaf node. Lastly, nodes 7 and 8 have address ranges of 1, indicating that nodes 7 and 8 can address only themselves.

Figure 5:
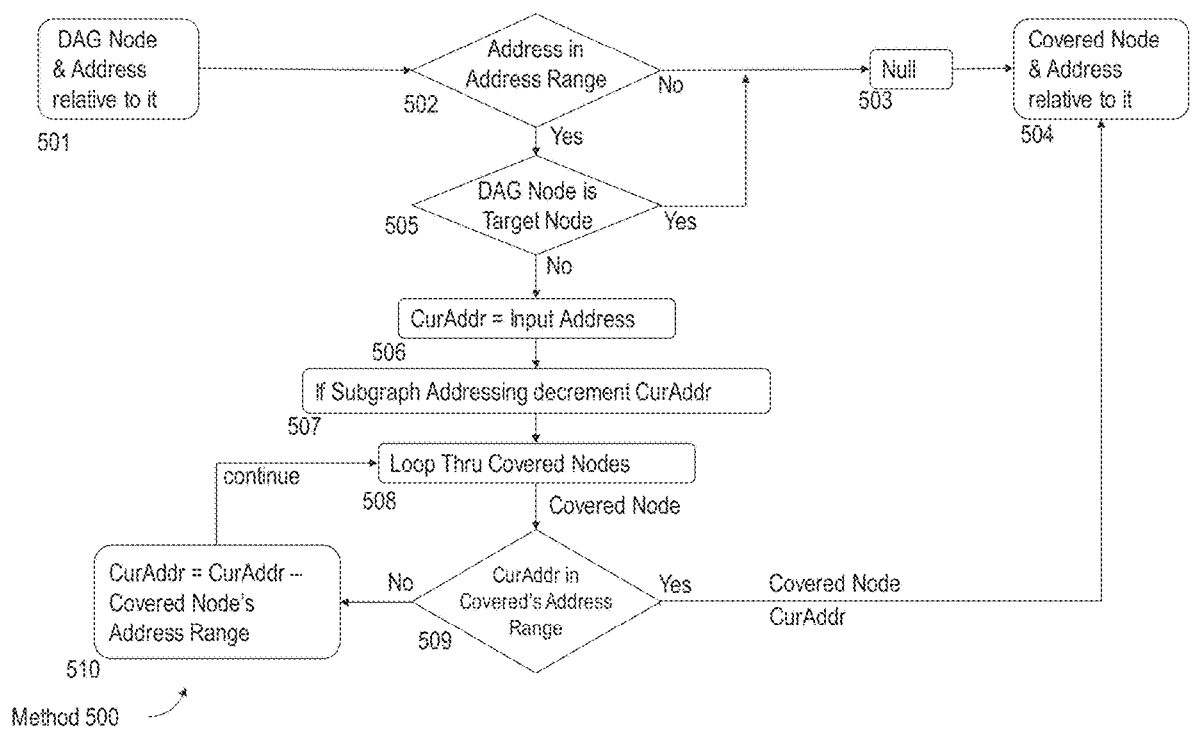
FIG. 5 is a flow diagram illustrating an example method for address resolution, in accordance with one or more techniques of this disclosure.

FIG. 5 is a flow diagram illustrating an example method for address resolution, in accordance with one or more techniques of this disclosure. Method 500 may be performed by a processor during the execution of an application, such as processors 240 and application 220 of FIG. 26. As such, "steps" of the method indicate that a processor may be performing the techniques described with respect to that step. Address resolution is the process of determining what path is addressed by some address. Given an address range, like 10 for node 1 in FIG. 3 Subgraph Addressing 350, address resolution determines what each address in the range [1, 10] addresses for node 1. Since each address range is the sum of the address ranges of that node's covered nodes, address resolution is the reverse process of determining which one of those covering nodes to use to continue address resolution and what address to recursively use for that node. A means of accomplishing this is divided into Method 500 which resolves an address one step and Method 600 which recursively uses Method 500 to fully resolve any address. FIG. 5 describes Method 500 which illustrates a means of resolving a DAG node and address relative to the DAG node one step to one of the DAG node's covered nodes and an address relative to that covered node.

In FIG. 5, step 501 identifies the inputs to Method 500 which are a DAG node and an address relative to that DAG node. Step 502 checks if the address is within DAG node's address range. If not (step 502 No), step 503 nulls the outputs and determines a covered node and an address relative to it. Step 504 returns the covered node and the relative address as the result of Method 500.

Normal processing proceeds from step 502 Yes to step 505, which tests if a DAG node is the target node being addressed. There are a couple of cases to be checked. First, if the DAG node is a leaf, the DAG node is the target node. Second, if subgraph addressing is being used and the address is 1, then the DAG node is also the target node. If DAG node is the target (step 505 Yes), the output is also set to Null. Otherwise, if not the target (step 505 No), step 506 sets CurAddr to the input address. Then step 507 decrements CurAddr by 1 if subgraph addressing is being used.

Step 508 is to loop through the DAG node's covered nodes. Since the DAG node is not a leaf, by the step 505 checks, there may be at least one covered node. Importantly, this loop may visit each of the covered nodes in the same order that Method 400 visits covered nodes while building DAG Node's address range.

Step 509 tests whether CurAddr is in the covered node's address range. If so (step 509 Yes), the current Covered Node and CurAddr are returned as the result of Method 500. Back in step 509, if CurAddr is not in the covered node's address range (step 509 No), step 510 is executed. Step 510 decrements CurAddr by the covered node's address range. Execution continues with step 508's loop over the covered nodes.

Each pass through step 508 is with a different CurAddr value. The value is the previous value decremented by the address range of the previous covered node. Because the address range of the DAG node is the sum of the address ranges of that node's covered nodes, and because the input address is in this range, eventually the value of CurAddr will fall in the range of one of the covered node's address ranges. Hence, Method 500 may get to step 504.

Method 500's inputs are a node and an address relative to that node. Method 500 resolves these inputs to one of the input node's covered nodes and an address relative to it. This allows Method 500's output to be used to execute Method 500 again. This is shown in Method 600 of FIG. 6.

Figure 6:
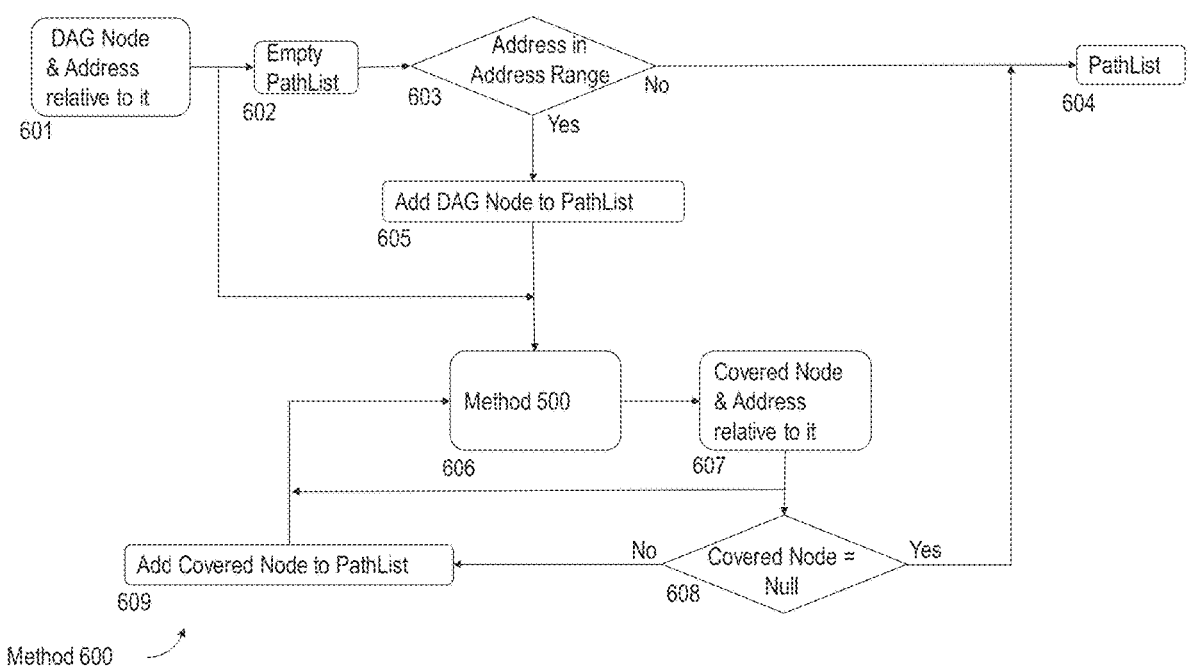
FIG. 6 is a flow diagram illustrating an example method for full address resolution, in accordance with one or more techniques of this disclosure.

FIG. 6 is a flow diagram illustrating an example method for full address resolution, in accordance with one or more techniques of this disclosure. Method 600 may be performed by a processor during the execution of an application, such as processors 240 and application 220 of FIG. 26. As such, "steps" of the method indicate that a processor may be performing the techniques described with respect to that step. FIG. 6 describes Method 600 which illustrates a means of recursively executing Method 500 to generate a path showing how an address is resolved. The input for Method 600, step 601, is a DAG node and an address relative to it. Step 602 initializes the PathList, that is being computed as the output, to be empty. Step 603 tests if the input address is within the DAG node's address range. If not (step 603 No), the empty PathList is returned as the result of Method 600.

If the address is within the address range (step 603 Yes), step 604 adds the DAG node to the PathList as the head of that list. Step 606 then utilizes Method 500 on the DAG node and the address relative to the DAG node to compute a covered node and an address relative to the covered node in step 607. Step 608 tests for the covered node being null which, if true, indicates that the target node had been reached. In that case (step 608 Yes), the current PathList is returned as the result of Method 600.

If the covered node is not null (step 608 No), step 609 adds the covered node to the PathList. Then, recursively, step 606 again utilizes Method 500 on the covered node and the address relative to it.

The result of executing Method 600 is to create a PathList for the DAG node and the address relative to it. The created PathList starts with the DAG node and lists, in order, the nodes along the cover path specified by the address. The PathList ends with the target node denoted by the original address relative to the DAG node.

FIG. 7 is an informational diagram illustrating an example table produced using the method of FIG. 6, in accordance with one or more techniques of this disclosure. FIG. 3 shows the subgraph addressing 350 DAG. In it, node 1 has an address range of 10. FIG. 7 shows Table 700 that results from executing Method 600 for node 1 with each of those 10 addresses. Because of the subgraph addressing, Table 700 shows that there is an address for each node with multiple paths to node 8. Because node 2 has an address range of 7, there are seven entries in the table going to or through node 2.

In general, Method 600 can be used to create a table like Table 700 for any DAG (or subgraph of any DAG's node) where the table has an entry for every possible path to each leaf for leaf addressing or each node for subgraph addressing.

In subgraph addressing 350, addressing is top-down from node 1 toward nodes 7 and 8. Top-down addressing starts from any node, like node 1, and follows all possible cover paths from that node toward the DAG's leaves.

DAG path addressing can also be applied bottom-up. Instead of a cover path, define a covering path as extending from a node to a node that covers the original node and optionally, iteratively, to some other covering node in the DAG. Bottom-up addressing starts from any node and follows any covering path from that node toward the DAG's roots.

Figure 8:
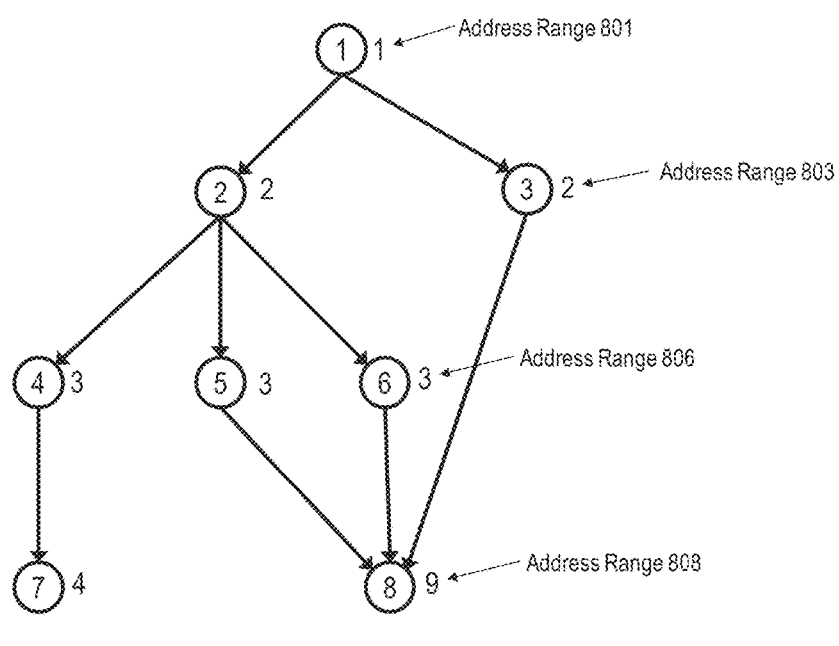
FIG. 8 is a conceptual diagram illustrating an example DAG with bottom-up addressing, in accordance with one or more techniques of this disclosure.

FIG. 8 is a conceptual diagram illustrating an example DAG with bottom-up addressing, in accordance with one or more techniques of this disclosure. FIG. 8 shows DAG 800 which is the same as DAG 100 except that DAG 800 is annotated with bottom-up generated subgraph addressing address ranges. For subgraph addressing, a covered node's address range is the sum of the address ranges of the covered node's covering nodes +1.

In DAG 100, node 1 is a root but in DAG 800 node 1 is a leaf because of the bottom-up addressing. Consequently, being a leaf, node 1's address range in DAG 800 is 1, labeled address range 801. Node 3's address range is the sum of node 3's covering nodes +1 which results in an address range of 2, labeled address range 803, since node 3's only covering node is leaf node 1. For the same reasons, node 2's address range is also 2. Node 6's address range is the sum of node 6's only covering node, node 2's address range of 2+1 to equal 3, labeled address range 806. Lastly, node 8's address range is the sum of the address ranges of node 8's covering nodes +1 or 3 for node 3, +3 for node 6, and +2 for node 3+1, or 3+3+2+1=9, labeled address range 808.

In effect, top-down and bottom-up addressing provides a means for DAG path addressing to be applied to any DAG or node of a DAG from either the covering to covered perspective or from the covered to covering perspective. If storage is provided for two address ranges, both can be applied to the same DAG.

Figure 9:
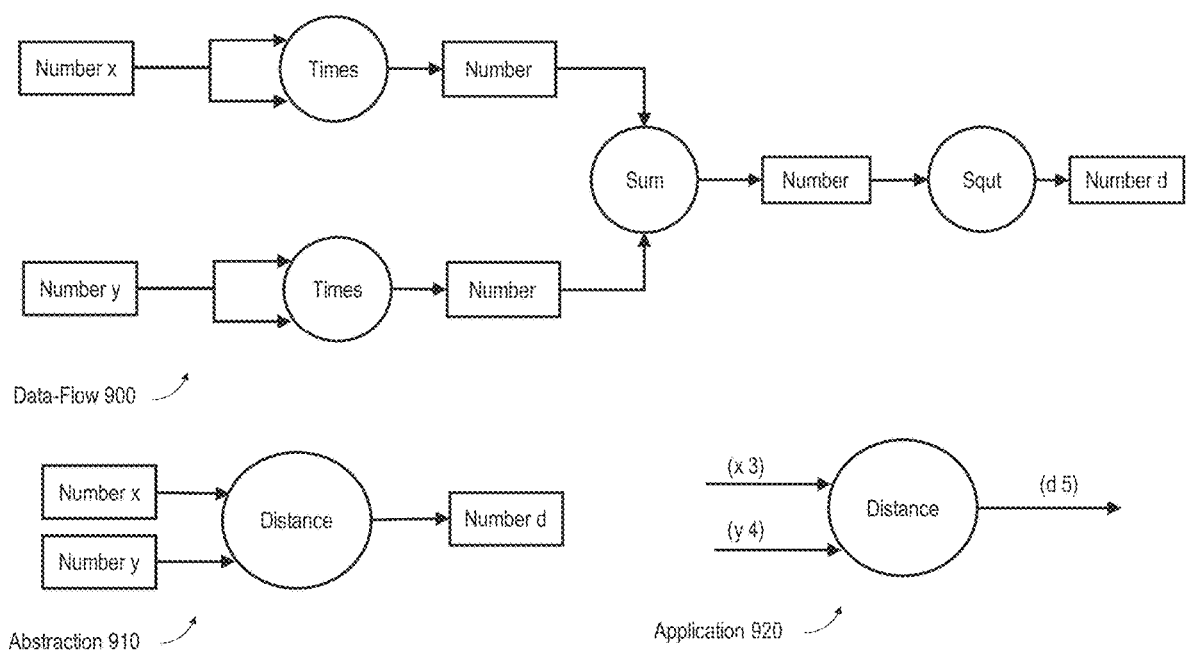
FIG. 9 is a conceptual diagram illustrating an example data-flow, in accordance with one or more techniques of this disclosure.

FIG. 9 is a conceptual diagram illustrating an example data-flow, in accordance with one or more techniques of this disclosure. In a parts list DAG, like illustrated in FIG. 2, each path to a leaf typically indicates a different instance of that part. For example, in FIG. 2, node 8 denotes one part type that has three different instances. In some applications, like data-flow diagrams (DFDs), the opposite is true in that the same instances are intended to be the same.

To expand on this point, consider the problem of computing the distance d from the origin of point (x, y) using the equation d=sqrt($x^2$+$y^2$). FIG. 9 illustrates a DFD representation of this equation. In FIG. 9, data-flow 900 represents the definition of the distance equation. Abstraction 910 represents the abstraction of the distance equation definition where the definition operates on inputs x and y to produce result d. Application 920 represents applying the equation by substituting 3 for x and 4 for y to produce the result of 5 for d.

Some computer programs may display or even provide an editor to create and edit DFDs. But most do not take diagrams as input. Instead, some language is used to express the content of the diagram. Because those languages are linear in nature, variables are needed to distinguish connections.

In the following language example, the "|" separates the inputs from the outputs.

(Times [Number x] [Number x]|[Number xSquared])
(Times [Number y] [Number y]|[Number ySquared])
(Sum [Number xSquared] [Number ySquared]|[Number sumOfSquares])
(Sqrt [Number sumOfSquares]|[Number r])

Figure 10:
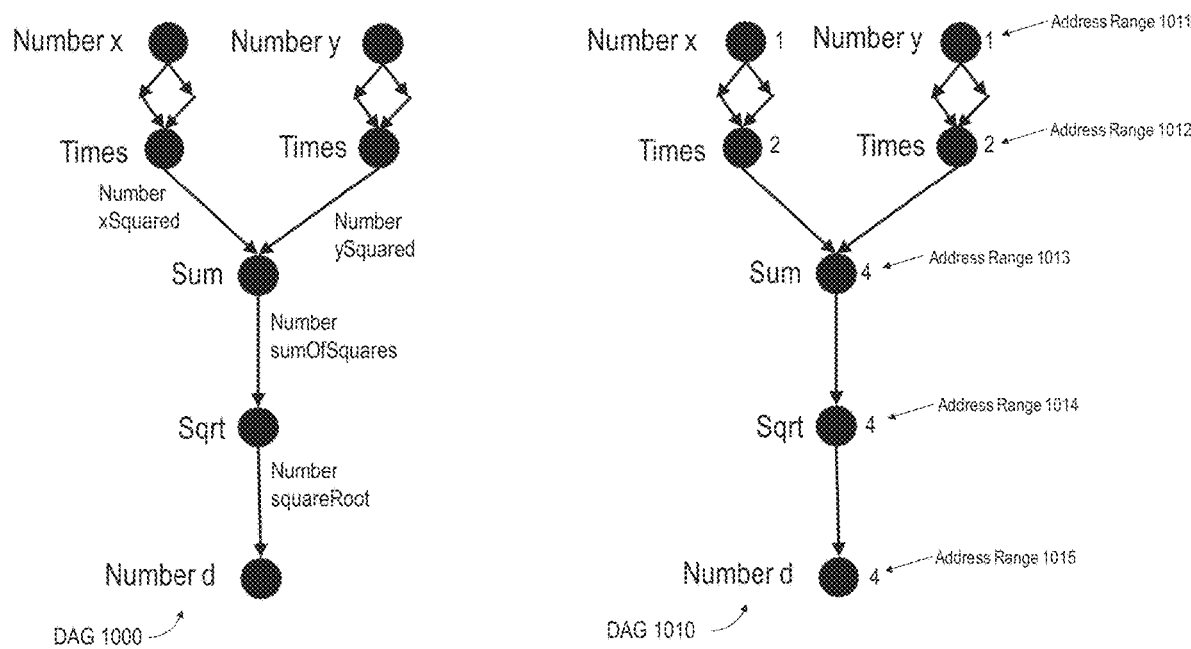
FIG. 10 is a conceptual diagram illustrating example DAGs corresponding to the data-flow of FIG. 9, in accordance with one or more techniques of this disclosure.

FIG. 10 is a conceptual diagram illustrating example DAGs corresponding to the data-flow of FIG. 9, in accordance with one or more techniques of this disclosure. The result of parsing and processing such language statements is typically a DAG representation of the diagram as shown in FIG. 10, DAG 1000. The DAG is drawn this way so that the arrows generally correspond to the flow of the computation represented by the DAG.

A problem is that, when 3 is substituted with x, it is not obvious where that 3 goes. This is because, in DAG 1000 there are four different paths to a top input number. The graph structure knows which is which and DAG path addressing can be used to distinguish them.

In FIG. 10, DAG 1010 shows the result of applying leaf addressing bottom-up to DAG 1000. With bottom-up, the leaves are at the top so the Number x and Number y nodes, being leaves, have an address range of 1 which, for Number y, is labeled address range 1011. The corresponding Times nodes have an address range of 2 because there are two paths to each with each path having a covering node with an address range of 1. The address range for the Times node on the right is labeled address range 1012. Similarly, the Sum node has address range 4 labeled address range 1013, Sqrt node has address range 4 labeled address range 1014, and the Number d node has address range 4 labeled address range 1015.

With DAG path addressing, the four addresses for the Number d node can be used to distinguish the different input Number's as shown in the following table.

| Number d's 4 DAG path addresses | | |
|---|---|---|
| Path Address | Number Referenced | Value Assigned |
| 1 | Number x | 3 |
| 2 | Number x | 3 |
| 3 | Number y | 4 |
| 4 | Number y | 4 |

The benefit is that the core equation can be factored out and represented as a DAG and DAG path addressing used to add different sets of names and/or values to the DAG's nodes.

Figure 11:
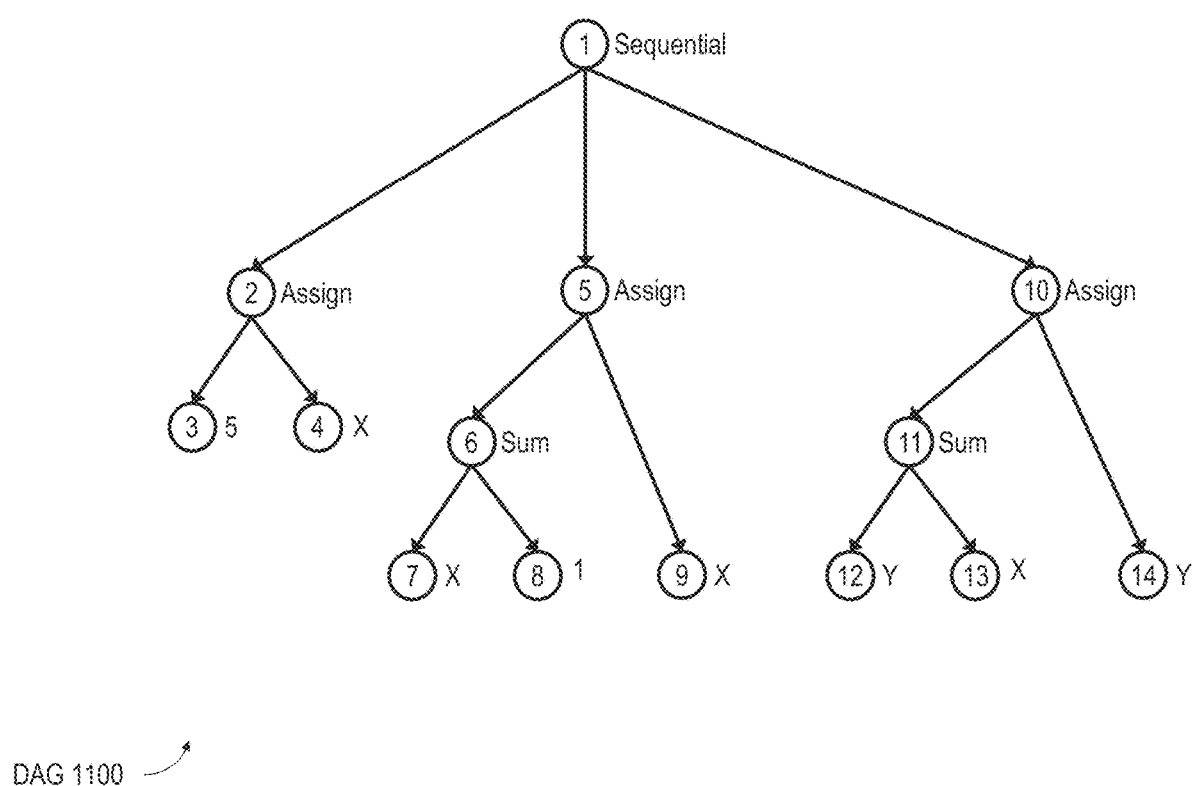
FIG. 11 is a conceptual diagram illustrating an example DAG for programming, in accordance with one or more techniques of this disclosure.

FIG. 11 is a conceptual diagram illustrating an example DAG for programming, in accordance with one or more techniques of this disclosure. In a parts list DAG, like illustrated in FIG. 2, each path to a leaf typically indicates a different instance of that part. For example, in FIG. 2 node 8 denotes one part type that has three different instances. In some applications, like most artificial languages, the opposite is often true. In a language statement, like x=x+1, the instances of x are expected to be the same x.

Processing statements in a language normally starts with a parser that generates an abstract syntax tree (AST). An AST is typically represented as a DAG. Consider the language snippet x=5; x=x+1; y=y+x which is shown in FIG. 11 as DAG 1100. The presumed order of interpretation and execution of branches is left to right. For example, the Sequential node indicates that the left most branch is interpreted and executed first. The Sequential node is followed by the middle branch and finally the right most branch. The Assign nodes assign the value computed for the left branch to the right branch. Each Sum node adds up the values of all of the Sum node's branches to form the value of its node.

Note that there are four different syntactic occurrences of the variable X and two different syntactic occurrences of the variable Y. Syntactically, these are distinct "parts" in the snippet above; but semantically, the four syntactic occurrences are the same variable which takes on different values during the execution. Language processing typically utilizes symbol tables to denote the name and memory location of each different variable and all the locations in the DAG that the variable occurs.

Binding is the process of determining that two or more occurrences of a variable are the same and associating those occurrences. One means of doing so is a binding list. If one had available unique identifiers or numbers to identify each node, a list of those identifiers could be used as a binding. However, this requires the ability to efficiently look up or find the node associated with any identifier or identifying number. One could also use node numbers, but node numbers have the problem that each incremental change to the DAG could require node numbers to be updated; and consequently, all the binding lists would also need updating. DAG path addressing offers a solution because each node's addresses are independent of other subgraphs of a larger DAG.

Figure 12:
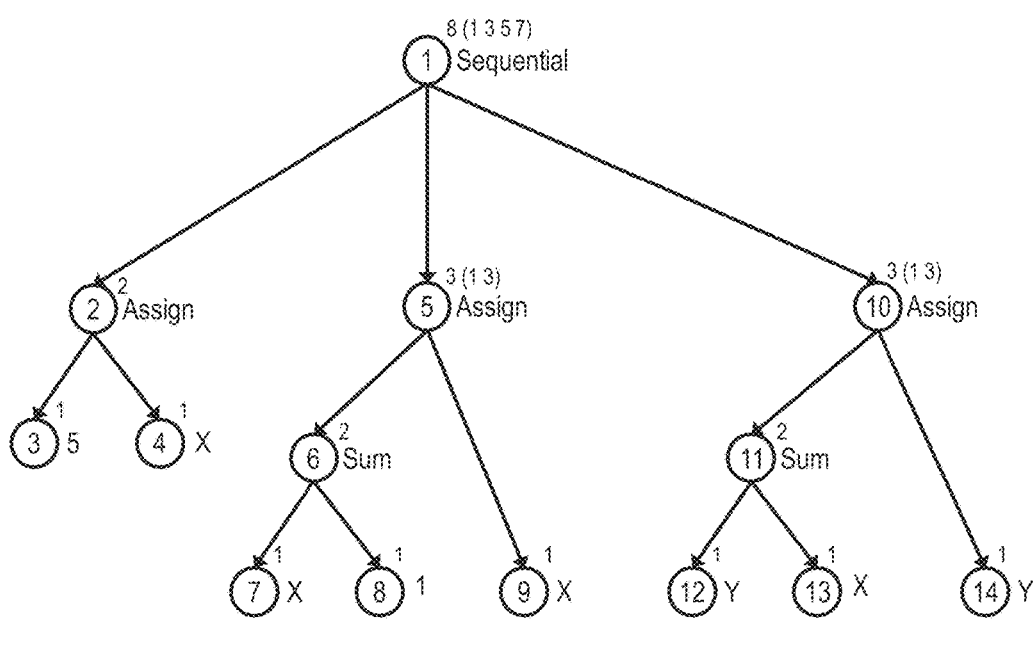
FIG. 12 is a conceptual diagram illustrating the example DAG of FIG. 11 along with address ranges and bindings, in accordance with one or more techniques of this disclosure.

FIG. 12 is a conceptual diagram illustrating the example DAG of FIG. 11 along with address ranges and bindings, in accordance with one or more techniques of this disclosure. FIG. 12 shows DAG 1200 which is DAG 1100 with two additions. First, leaf address ranges have been added to all nodes. And second, nodes 1, 5, and 10 have had a binding list added to those nodes. Each binding list contains leaf addresses for that node indicating that the leaves listed in the binding list are bound; that is, semantically considered to be the same variable.

The binding of node 1 is (1 3 5 7) and contains four leaf addresses, one for each X. The binding list indicates that all four are to be considered as the same variable. Note that there is some binding redundancy. In node 1's binding, addresses 3 and 5 are binding the same nodes that node 5's binding addresses of 1 and 3 bind.

Binding addressing allows a node's bindings to also be addressed. This allows bindings to be constructed hierarchically. For binding addressing, the address range is increased by the number of binding lists that semantically join the nodes addressed. This allows any leaf for leaf addressing (node for subgraph addressing) or binding in a node's subgraph to be addressed.

Figure 13:
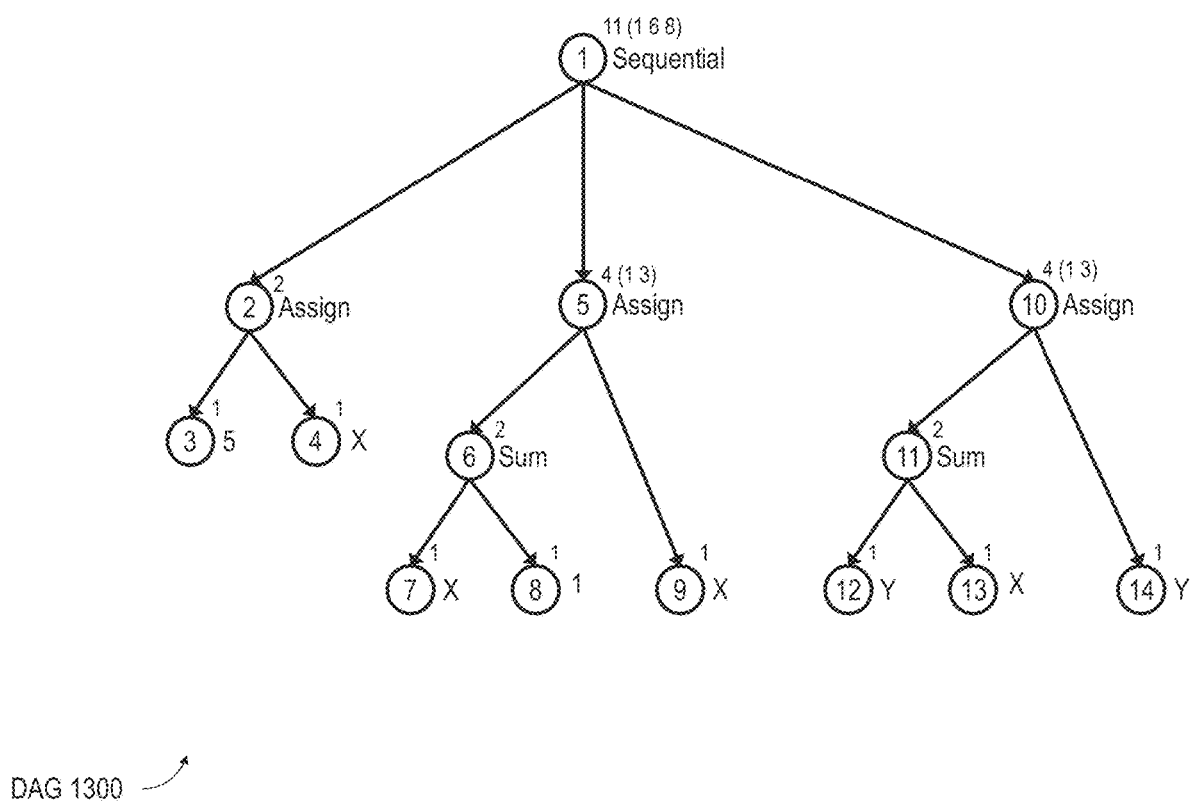
FIG. 13 is a conceptual diagram illustrating the example DAG of FIG. 11, with hierarchical binding addressing, in accordance with one or more techniques of this disclosure.

FIG. 13 is a conceptual diagram illustrating the example DAG of FIG. 11, with hierarchical binding addressing, in accordance with one or more techniques of this disclosure. FIG. 13 shows DAG 1300 which is DAG 1100 annotated with binding address ranges and corresponding bindings. Note that node 5 and node 10 have address ranges that have been increased to 4 because of their binding lists. The sum of node 1's covered node's address ranges is 10. As such, node 1's address range is 11 to account for the binding. Importantly, for this example, node 1's binding list only has three entries because the 3 and 5 have been replaced by a single address of 6 which identifies the binding of node 5. Also, the last binding address of 7 has been changed to 8 because of the increased address range of node 5.

To accommodate binding addressing, method 400 in FIG. 4 may have another test like step 9 that checks for binding addressing and, if so, adds the number of bindings. Similarly, in method 500 of FIG. 5, step 508 may have another output for when all covered nodes have been checked. Since the input address was checked to be in range, the additional output of step 508 may only happen when a binding list is addressed. In that case, the additional output is for the covered node to be Null but the address to be an index of which binding list to return.

Method 600 in FIG. 6 may see a similar change where step 608 is enhanced for binding addressing to check for the address not being 0 and, instead of being interpreted as an address, interpreted as the index over multiple binding lists. A more elaborate version of method 600 could return the binding list as well.

This disclosure describes conceptual graphs in some detail since conceptual graphs are not as widely known as parts lists and data-flow diagrams. In particular, the techniques described herein use binding addressing to factor out names.

A conceptual graph (CG) is a bipartite graph with two kinds of nodes, called concepts and conceptual relations. A concept is used to denote something real or abstract. A conceptual relation is used to express a relationship between or among some concepts.

Several languages have been defined to express CGs. This disclosure, for example purposes only, uses Conceptual Graph Interchange Format (CGIF), which is defined in the International Standard on Common Logic (CL), hereafter referred to as the CL Spec. However, the techniques described herein may be applicable to other CG languages.

In CGIF, concepts are contained in square brackets "[" and "]" and relations are contained in rounded brackets "(" and ")". For example, CG1=(On [Cat] [Mat])

expresses that there is a Cat, a Mat and a relationship that the Cat is on the Mat.

Another example, from the CL Spec, is the sentence "John is going to Boston by bus". The CG for this sentence can be represented in the extended form of CGIF as:

CG2=(Agnt [Go: *x] [Person: John])(Dest ?x [City:Boston])(Inst ?x [Bus: *y]).

Besides the extended form of CGIF, there is also a core form of CGIF for the same example: [Go: *x] [Person: John] [City: Boston] [Bus: *y] (Agnt ?x John) (Dest ?x Boston) (Inst ?x ?y). Most of the examples will be shown in the extended form.

Type labels specify the type of a concept or relation. In CG2, Cat, Mat, Go, Person, City and Bus are all concept type labels. Type labels also express the type of a relation. In CG2, Agnt, Dest, and Inst are all relation type labels.

Constants are used to identify particular individuals, real or abstract. For example, in the concept [Person: John], the constant John identifies a particular Person. Similarly, Boston identifies a particular City.

Labels are syntactically distinguished from constants because defining labels are preceded by in CGIF. For example, in the concept [Go: *x], the label *x identifies some instance of Go. In contrast with constants that identify a single specific individual, labels identify some single but arbitrary individual. Similarly, in the concept [Bus: *y], the label *y identifies some instance of a Bus rather than a named one as would be the case if a constant were used.

Bound labels are syntactically distinguished by a '?' preceding it. In CG2, ?x in (Dest ?x [City: Boston]) and ?x in (Inst ?x [Bus: *y]) denote the same individual as the defining label *x.

Figure 14:
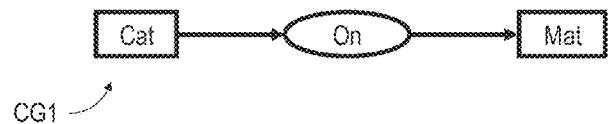
FIG. 14 is a conceptual diagram illustrating example conceptual graphs, in accordance with one or more techniques of this disclosure.
Figure 14:
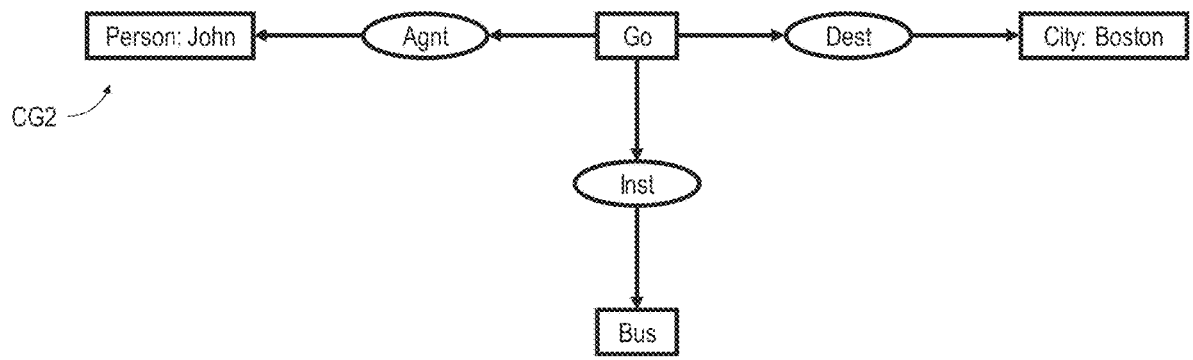

FIG. 14 is a conceptual diagram illustrating example conceptual graphs, in accordance with one or more techniques of this disclosure. There is a display form that is used to illustrate CGs for easier understanding. FIG. 14 shows the display form for CG1 and CG2. In the display form, concepts are represented by rectangles and relations by rounded rectangles with arcs. Those arcs point from the first argument(s) to the last one. For example, (Agnt [Go: *x] [Person: John]) has arcs from [Go: *x] and to [Person: John].

Significantly, the defining label *x and that label's corresponding bound labels ?x from the CGIF are not needed in the display form. A primary reason the display form of CGs is easier to understand is that most labels are not needed because multiple arcs can be drawn from the same rectangle. In this example, the [Go] concept has three outgoing arcs instead of a defining label.

One way to represent CGs in a computer system is to compose primitive parts into more and more complex groupings. This allows each new CG to be added as a composition of existing and new parts. And, as the overall composition grows, the number and variety of existing parts grows and the number of new parts decreases. Consequently, adding even very complex graphs does not necessarily require adding many new parts.

To decompose a CG into more primitive parts, start with CG2 from above for "John is going to Boston by bus":

CG2=(Agnt [Go: *x] [Person: John]) (Dest ?x [City: Boston]) (Inst ?x [Bus: *y])

CG2 can be decomposed into three parts, one for each relation:

CG5=(Agnt [Go: *x] [Person: John])
CG6=(Dest ?x [City: Boston])
CG7=(Inst ?x [Bus: *y])

Figure 15:
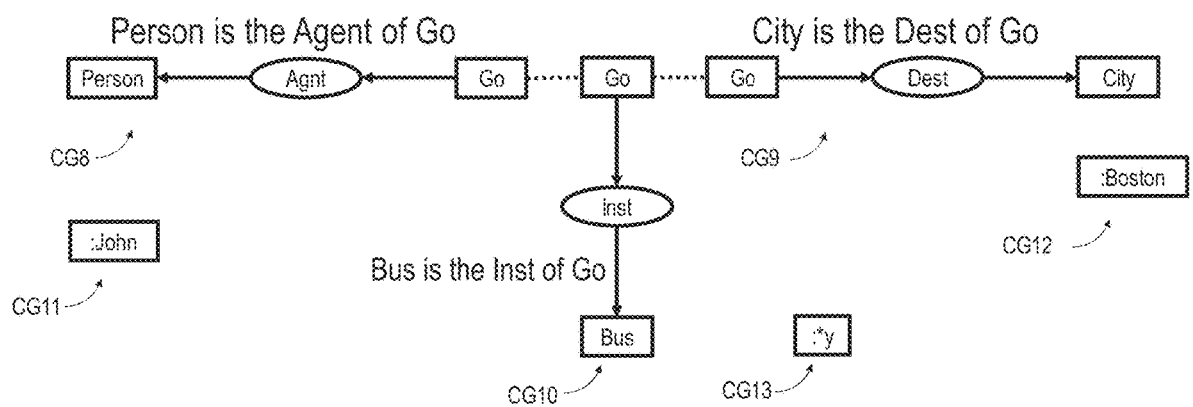
FIG. 15 is a conceptual diagram illustrating example conceptual graph components, in accordance with one or more techniques of this disclosure.

FIG. 15 is a conceptual diagram illustrating example conceptual graph components, in accordance with one or more techniques of this disclosure. The constants and labels can be extracted and generic versions of these relations, call star graphs, can be created to be basic building blocks as shown in FIG. 15.

CG8=(Agnt [Go] [Person])
CG9=(Dest [Go] [City])
CG10=(Inst [Go] [Bus])

Star graphs have generic concepts as their arguments. The general CGIF form of a generic concept is [typelabel]. So, the generic concept for [Person: John] is [Person], that for [City: Boston] is [City], and that for [Bus: *y] is [Bus].

Referent concepts are concepts with just a referent. For example, [:John], [:Boston] and [:*y] are referent concepts, as also shown in FIG. 15.

CG11=[:John]
CG12=[:Boston]
CG13=[:*y]

The importance of referent concepts is that referent concepts identify individuals; whereas, star graphs represent generic relationships that could exist between or among individuals. In FIG. 15, CG2 has been decomposed into more basic parts, referent concepts and star graphs.

Figure 16:
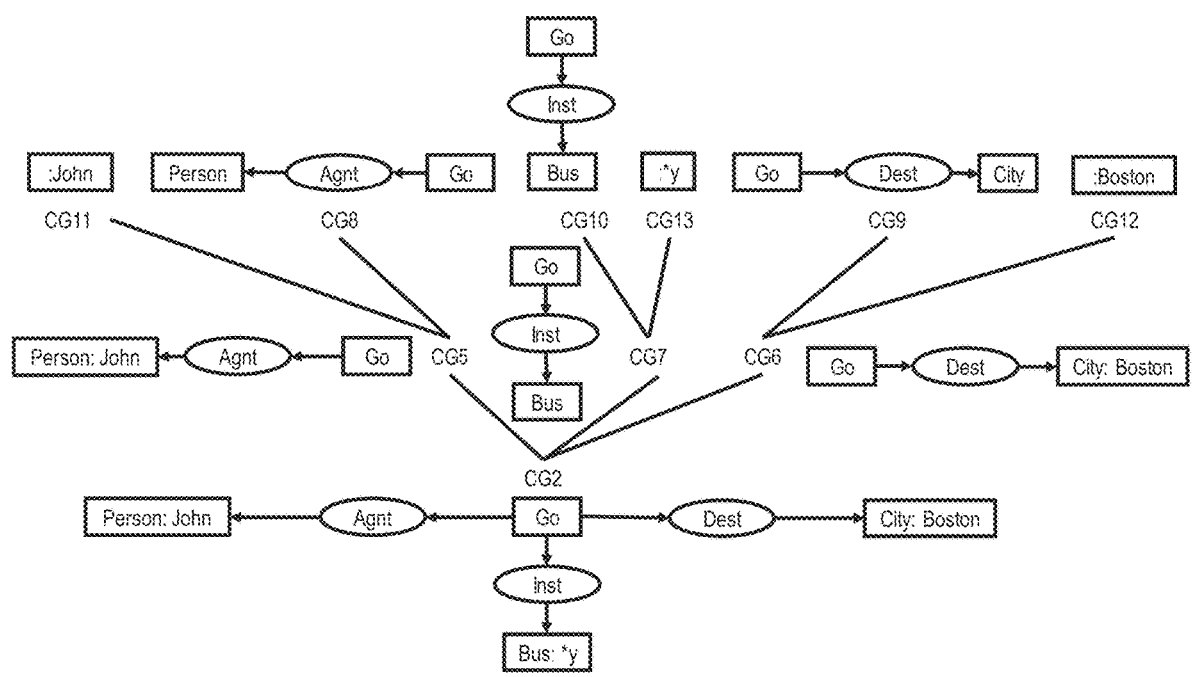
FIG. 16 is a conceptual diagram illustrating example conceptual graph component composition, in accordance with one or more techniques of this disclosure.

FIG. 16 is a conceptual diagram illustrating example conceptual graph component composition, in accordance with one or more techniques of this disclosure. The next step is to join the parts together to form CG2. In the case of [Person], [City], and [Bus], a referent concept is joined by including that part in the concept. So

[Person] joined with [:John] yields [Person: John],
[City] joined with [:Boston] yields [City: Boston], and
[Bus] joined with [:*y] yields [Bus: *y].

Joining the [Go] concepts is more interesting because there is no referent concept. The dotted co-referent links shown in FIG. 15 is used to show that the three [Go] concepts are referring to the same individual. But that is not necessary in the display form because the three [Go] concepts can be merged as shown at the bottom of FIG. 16. The net result is that CG2 can be obtained by joining more basic parts, referent concepts and star graphs.

Composing something from parts is a hierarchical process because the composed pieces can be further used to compose even more complex parts. FIG. 16 illustrates the composition hierarchy for CG2. The lines connecting the parts, like CG8 to CG5, are called compositional links.

If referent concepts and star graphs are being used to build a variety of larger and larger graphs, being able to use multiples of the same parts is important. Consider adding "Sue is going to Boston by train." The additional CGs needed are CG14=[:Sue]
CG15=(Agnt [Go: *x] [Person: Sue])
CG16=[:*z]
CG17a=(Inst [Go: ?x] [Train])
CG17=(Inst [Go: ?x] [Train: *z])
CG18=(Agnt [Go: *x] [Person: Sue]) (Dest ?x [City: Boston]) (Inst ?x [Train: *z])

Figure 17:
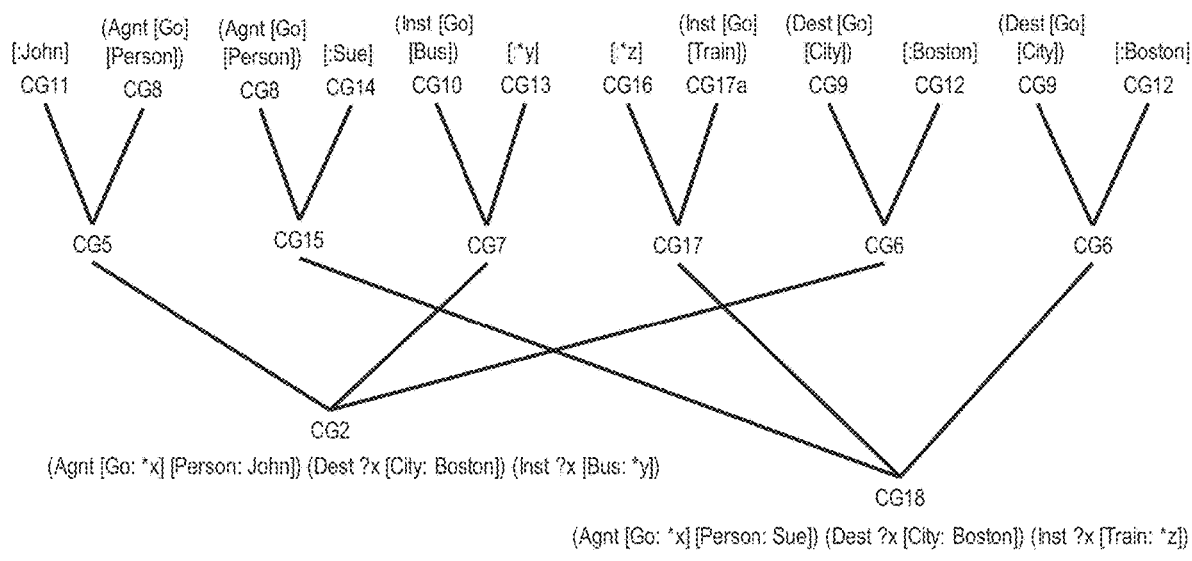
FIG. 17 is a conceptual diagram illustrating an example DAG with a conceptual graph and conceptual graph component compositions, in accordance with one or more techniques of this disclosure.

FIG. 17 is a conceptual diagram illustrating an example DAG with a conceptual graph and conceptual graph component compositions, in accordance with one or more techniques of this disclosure. With the above CGs, a processor can form a compositional hierarchy DAG that includes both CG2 and CG18 as shown in FIG. 17, DAG 17.

The basic idea is that many large CGs can be decomposed into a set of parts used to construct the CGs and a compositional hierarchy indicates how those parts are combined to form the original CGs.

Figure 18:
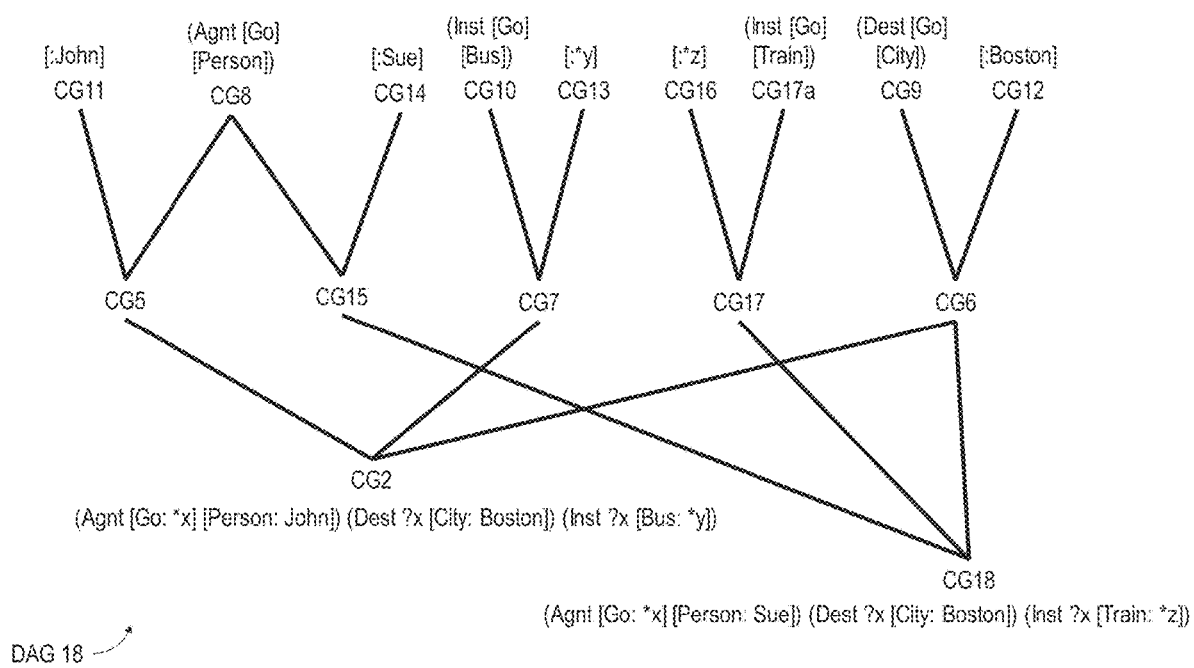
FIG. 18 is a conceptual diagram illustrating an example DAG with a conceptual graph and conceptual graph component composition networks, in accordance with one or more techniques of this disclosure.

FIG. 18 is a conceptual diagram illustrating an example DAG with a conceptual graph and conceptual graph component composition networks, in accordance with one or more techniques of this disclosure. In FIG. 17, some CG parts, like CG8, CG9, CG12 & CG6, are reused. When a composite is made from physical parts, the physical parts need to be replicated. However, for CGs, the same part can be used in multiple compositions; that is, only one is needed in the composition. The result is a compositional network, DAG 18, as shown in the FIG. 18.

Figure 19:
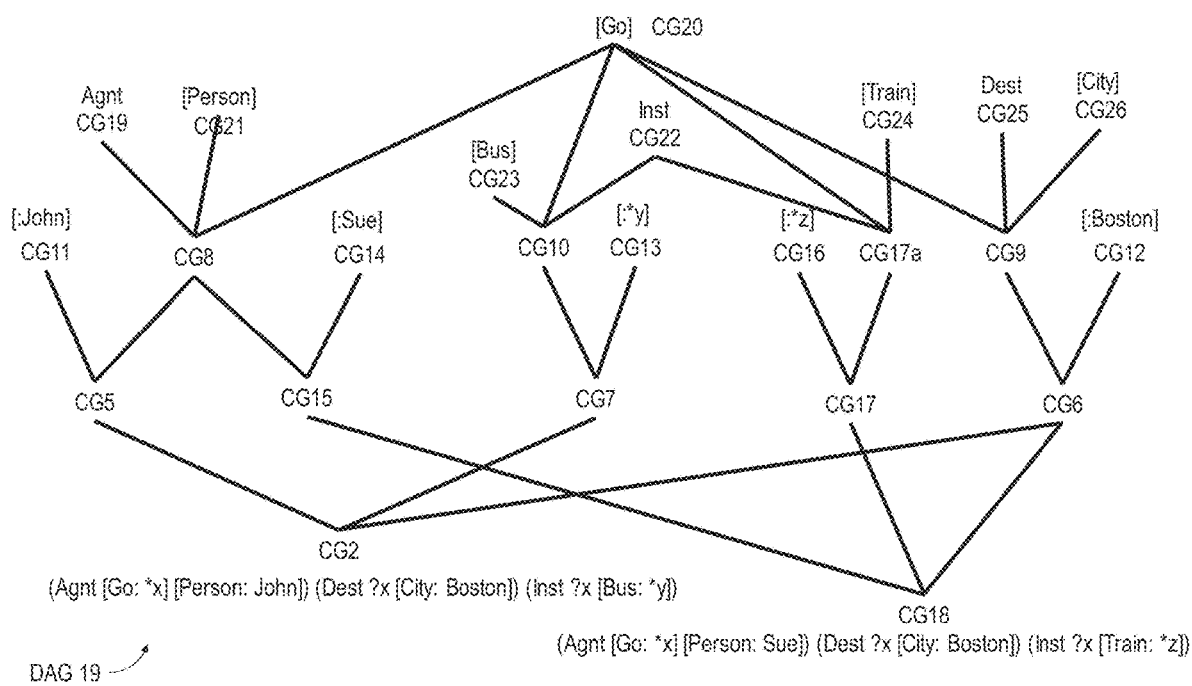
FIG. 19 is a conceptual diagram illustrating an example DAG with a conceptual graph and conceptual graph component composition networks with star graphs decomposed, in accordance with one or more techniques of this disclosure.

FIG. 19 is a conceptual diagram illustrating an example DAG with a conceptual graph and conceptual graph component composition networks with star graphs decomposed, in accordance with one or more techniques of this disclosure. Star graphs can also be decomposed into their constituent parts. For example, (Agnt [Go] [Person]) can be decomposed into type label Agent and concepts [Go] and [Person]. Similarly, (Inst [Go] [Bus]) can be decomposed into type label Inst and concepts [Go] and [Bus], (Inst [Go] [Train]) into type label Inst and concepts [Go] and [Train], and (Dest [Go] [City]) into type label Dest and concepts [Go] and [City].

This results in the following additional CG parts:

CG19=Agnt
CG20=[Go]
CG21=[Person]
CG22=Inst
CG23=[Bus]
CG24=[Train]
CG25=Dest
CG26=[City]

When that is done, the resulting compositional network, DAG 19, is shown in FIG. 19. The primitive parts are now referent concepts, like [:John] and [:*x], generic concepts, like [Person] and [Go], and type labels like Agnt, Inst & Dest.

Figure 20:
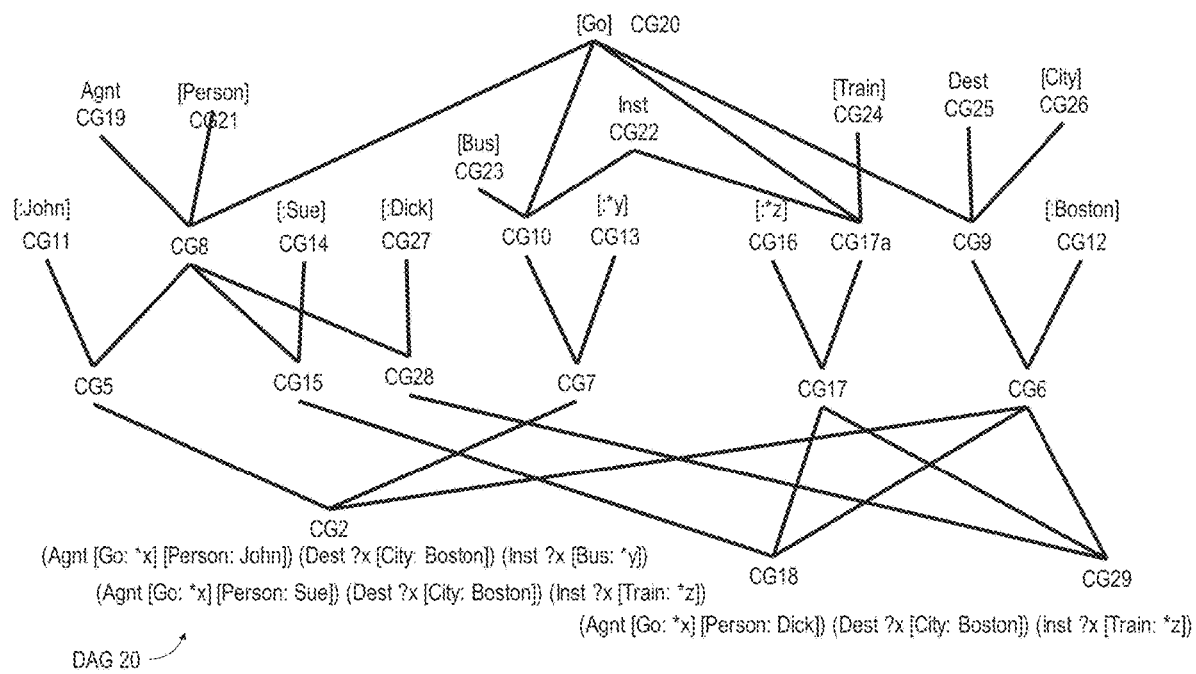
FIG. 20 is a conceptual diagram illustrating an example DAG with a conceptual graph and conceptual graph component composition networks with common parts, in accordance with one or more techniques of this disclosure.

FIG. 20 is a conceptual diagram illustrating an example DAG with a conceptual graph and conceptual graph component composition networks with common parts, in accordance with one or more techniques of this disclosure. Shared parts occurs when one composition shares two or more parts with another composition. For example, consider adding "Dick is going to Boston by train." The additional CGs needed are CG27=[:Dick]
CG28=(Agnt [Go: *x] [Person: Dick])
CG29=(Agnt [Go: *x] [Person: Dick]) (Dest ?x [City: Boston]) (Inst ?x [Train: *z])

Additional nodes for (Dest ?x [City: Boston]) and (Inst ?x [Train: *z]) are not needed because these parts can be reused as shown in FIG. 20, DAG 20.

Figure 21:
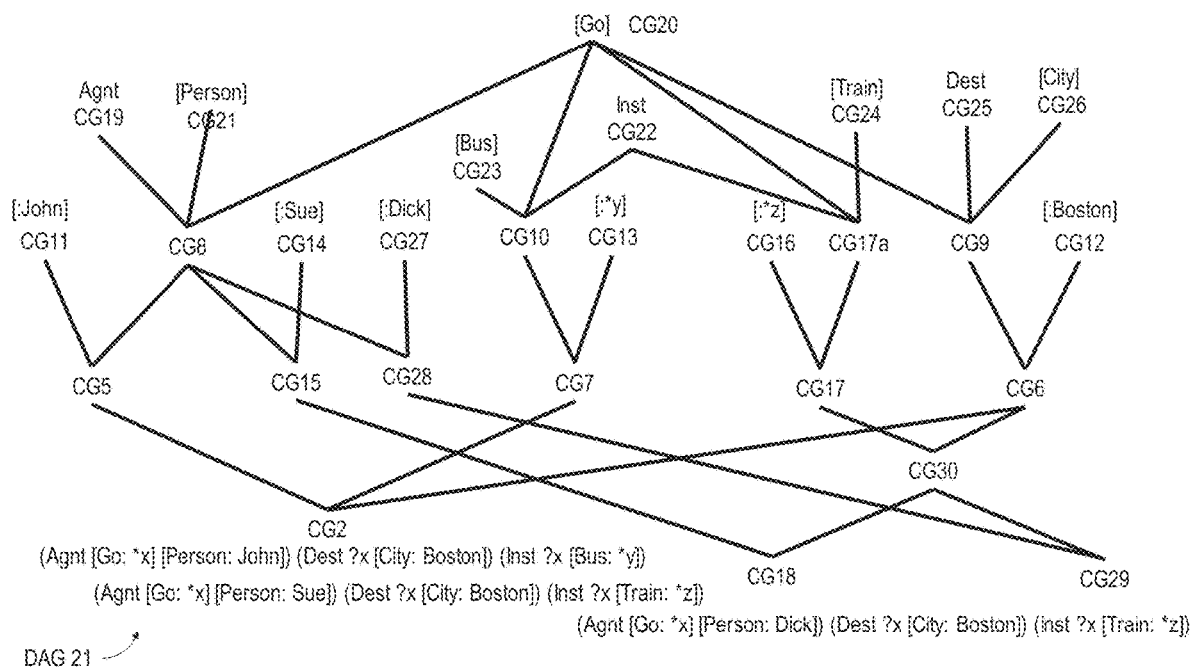
FIG. 21 is a conceptual diagram illustrating the example DAG of FIG. 20 with an inserted common part, in accordance with one or more techniques of this disclosure.

FIG. 21 is a conceptual diagram illustrating the example DAG of FIG. 20 with an inserted common part, in accordance with one or more techniques of this disclosure. CG18 and CG29 have two parts in common, CG17 and CG6. A node can be added for the shared parts which is CG30=(Dest ?x [City: Boston]) (Inst ?x [Train: *z]) which, when used, simplifies the compositional network to DAG 21 as shown in FIG. 21.

Figure 22:
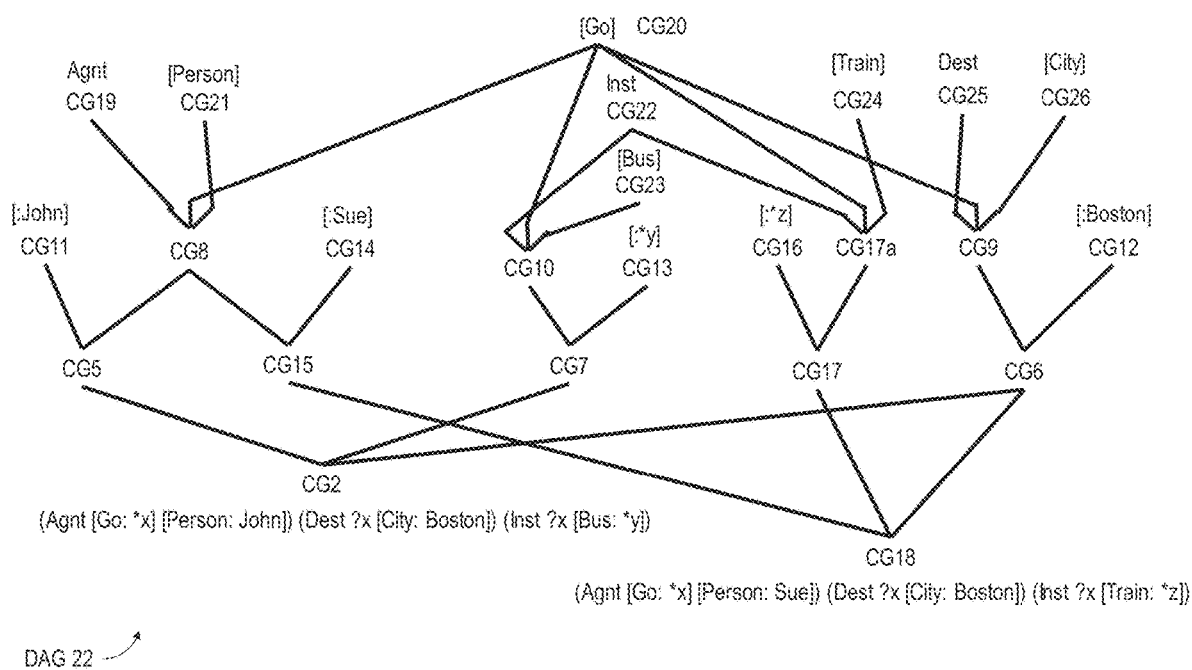
FIG. 22 is a conceptual diagram illustrating an example DAG with ordered relation parts, in accordance with one or more techniques of this disclosure.

FIG. 22 is a conceptual diagram illustrating an example DAG with ordered relation parts, in accordance with one or more techniques of this disclosure. There are several issues in compositional networks that have to do with identifying which part goes where when composing parts:

Maintaining and using the order of star graph parameters and;

Joining two or more concepts such as joining multiple generic concepts and joining a reference concept to the right star graph generic concept.

Since compositional networks are examples of directed acyclic graphs (DAGs), DAG path addressing techniques can be applied to resolve these issues. The first step is to be sure each DAG node corresponding to a relation has its arcs in the same fixed order. In these compositional networks, the order is bottom-up. That means upward arcs from a relation node may be in the same order, relation type and parameters in CGIF defined order.

To keep the graphs from getting too complicated, FIG. 22 is based on FIG. 19. In FIG. 22 the composition links for each star graph in FIG. 19 are assumed to be in the order type then ordered parameters. An ordering map can be kept by a data structure. Here the order of the composition links is made to match the star graph ordering. Hence there are some crossovers to connect to the right composition link.

DAG 22 represents the compositional ordering by the order of DAG 22's parts. CG8, CG10, CG16 and CG9 have some crossovers so that the parts are connected in the proper order.

There are other ways to represent the compositional ordering of parts such as the following table.

| CG | Parts Are | Part | Part Of |
|---|---|---|---|
| (Agnt [Go: *x] [Person: John]) (Dest ?x [City: Boston]) (Inst ?x [Bus: *y]) | CG5 CG7 CG6 | CG2 | — |
| (Agnt [Go] [Person: John]) | CG11 CG8 | CG5 | CG2 |
| (Dest [Go] [City: Boston]) | CG9 CG12 | CG6 | CG18 |
| (Inst [Go] [Bus: *y]) | CG10 CG13 | CG7 | CG2 |
| (Agnt [Go] [Person]) | CG19 CG20 CG21 | CG8 | CG5 CG15 |
| (Dest [Go] [City]) | CG25 CG20 CG26 | CG9 | CG6 |
| (Inst [Go] [Bus]) | CG22 CG20 CG23 | CG10 | CG7 |
| [:John] | — | CG11 | CG5 |
| [:Boston] | — | CG12 | CG6 |
| [:*y] | — | CG13 | CG7 |
| [:Sue] | — | CG14 | CG15 |
| (Agnt [Go] [Person: Sue]) | CG8 CG14 | CG15 | CG18 |
| [:*z] | — | CG16 | CG17 |
| (Inst [Go] [Train]) | CG22 CG20 CG24 | CG17a | CG17 |
| (Inst [Go: ?x] [Train: *z]) | CG16 CG17a | CG17 | CG18 |
| (Agnt [Go: *x] [Person: Sue]) (Dest ?x [City: Boston]) (Inst ?x [Train: *z]) | CG15 CG17 CG6 | CG18 | — |
| Agnt | — | CG19 | CG8 |
| [Go] | — | CG20 | CG8 CG9 CG10 CG17 |
| [Person] | — | CG21 | CG8 |
| Inst | — | CG22 | CG10 CG17 |
| [Bus] | — | CG23 | CG10 |
| [Train] | — | CG24 | CG17a |
| Dest | — | CG25 | CG9 |
| [City] | — | CG26 | CG9 |

In this table the ordering of the parts in the Parts Are column reflects the order of the parameters.

The compositional network can be represented many ways. Two are shown above in FIG. 22 and the compositional ordering table. Either composition link order in a graph or Parts Are column in a table can be used to reference a part's parts.

This section applies DAG path addressing concepts to the problem of specifying which specific CG parts are to be combined. In these composition network figures, the DAGs are bottom-up oriented; that is, the roots are at the bottom of the figure and the leaves are at the top. DAG path addressing has three forms of addressing: leaf, subgraph, and binding.

For CGs, the combination of leaf and binding addressing is used where the leaves are the referents like [:John] and [:*y] and generic concepts like [Person] and [Bus]. The following paragraphs apply leaf addressing and then apply biding addressing.

Consider CG5=(Agnt [Go] [Person: John]) and CG5's parts CG11=[:John] and CG8=(Agnt [Go] [Person]). When the CG11 and CG8 parts are composed to form CG5, instances of [Go] do not have names like John, so [:John] may go with [Person]. However, computer systems do not have that kind of knowledge; so, a way is needed to state that CG11=[:John] gets joined with the CG21=[Person] part of CG8.

To state such associations, it is necessary to be able to refer to the parts involved, CG11 and CG21. This is accomplished using DAG path addresses. The "path" word indicates that there is a starting node and that the PathAddr is relative to that starting node and sensitive to the order of the path's parts. Primitive parts are not composed of any other parts. Primitive parts are the leaves of the DAG path addressing. The primitive parts are the things being addressed. Consequently, the primitive parts (leaves) have a PathAddr of 1. For example, CG11 and CG21 both have PathAddr's of 1.

Parts like CG8, CG9, and CG10 are entirely composed of primitive parts. For example, CG8 is composed of primitive parts CG19, CG20 & CG21. Since CG8's compositional links are ordered, the compositional links can be used to reference CG8's parts; that is, link 1 leads to CG19, link 2 leads to CG20, and link 3 leads to CG21. The path addressing is relative to the composing part, in this case CG8.

If CG9 is the composing part, link 1 leads to CG25, link 2 leads to CG20, and link 3 leads to CG26. If CG10 is the composing part and if using the above compositional ordering table to represent the composition network, a processor could look up the values in the "Parts Are" column for CG10 and obtain CG22 CG20 CG23. This is the same set found if following the compositional links of FIG. 22.

The DAG path address range of a primitive part (leaf) is 1 since the primitive part does not have any parts. If a non-primitive part has p primitive parts, then that part's AddrRange is of size p. Parts with non-primitive parts need to add up the AddrRange of each of its parts. For example, CG5's AddrRange is 4=the sum of the AddrRange for primitive part CG11 being 1 plus that for CG8 being 3. In general, the AddrRange of a part is the sum of the Addr-Ranges of its parts.

To compute the AddrRange for CG2, a processer may also compute the AddrRanges for CG7 and CG6. The AddrRange for CG10 is 3 and for CG13 is 1, so the AddrRange for CG7 is their sum or 4. Similarly, the AddrRange of CG9 is 3 and for CG12 is 1, so the AddrRange for CG6 is their sum or 4. Adding up the AddrRanges for CG5, CG6 & CG7, the AddrRange of CG2 is 12.

This means that there are paths in the composition network from CG2 to 12 primitive parts. Each of those parts has a PathAddr from CG2 ranging from 1 to 12. The AddrRanges for the full example is shown in the table below. The addresses can be obtained for any node by applying the DAG path addressing's address resolution method to each address in the address range as shown in the following table.

| Node | Range | Address |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
|  |  |  |  |  |  | Node Referenced by Address |  |  |  |  |  |  |  |
| 2 | 12 | 11 | 19 | 20 | 21 | 22 | 20 | 23 | 13 | 25 | 20 | 26 | 12 |
| 5 | 4 | 11 | 19 | 20 | 21 |  |  |  |  |  |  |  |  |
| 6 | 4 | 25 | 20 | 26 | 12 |  |  |  |  |  |  |  |  |
| 7 | 4 | 22 | 20 | 23 | 13 |  |  |  |  |  |  |  |  |
| 8 | 3 | 19 | 20 | 21 |  |  |  |  |  |  |  |  |  |
| 9 | 3 | 25 | 20 | 26 |  |  |  |  |  |  |  |  |  |
| 10 | 3 | 22 | 20 | 23 |  |  |  |  |  |  |  |  |  |
| 11 | 1 | 11 |  |  |  |  |  |  |  |  |  |  |  |
| 12 | 1 | 12 |  |  |  |  |  |  |  |  |  |  |  |
| 13 | 1 | 13 |  |  |  |  |  |  |  |  |  |  |  |
| 14 | 1 | 14 |  |  |  |  |  |  |  |  |  |  |  |
| 15 | 4 | 19 | 20 | 21 | 14 |  |  |  |  |  |  |  |  |
| 16 | 1 | 16 |  |  |  |  |  |  |  |  |  |  |  |
| 17a | 3 | 22 | 20 | 24 |  |  |  |  |  |  |  |  |  |
| 17 | 4 | 16 | 22 | 20 | 24 |  |  |  |  |  |  |  |  |
| 18 | 12 | 19 | 20 | 21 | 14 | 16 | 22 | 20 | 24 | 25 | 20 | 26 | 12 |
| 19 | 1 | 19 |  |  |  |  |  |  |  |  |  |  |  |
| 20 | 1 | 20 |  |  |  |  |  |  |  |  |  |  |  |
| 21 | 1 | 21 |  |  |  |  |  |  |  |  |  |  |  |
| 22 | 1 | 22 |  |  |  |  |  |  |  |  |  |  |  |
| 23 | 1 | 23 |  |  |  |  |  |  |  |  |  |  |  |
| 24 | 1 | 24 |  |  |  |  |  |  |  |  |  |  |  |
| 25 | 1 | 25 |  |  |  |  |  |  |  |  |  |  |  |
| 26 | 1 | 26 |  |  |  |  |  |  |  |  |  |  |  |

Back to the problem of stating for CG5 that CG11=[:John] gets joined with the CG21=[Person] part of CG8. From the above table, the AddrRange for CG5 is 4 which means 4 primitive parts can be addressed from CG5 as follows:

PathAddr 1 addresses CG11=[:John]
PathAddr 2 addresses CG19=Agnt
PathAddr 3 addresses CG20=[Go]
PathAddr 4 addresses CG21=[Person]

Each row of the above table results in this kind of address map. From CG5's address map, PathAddr's 1 & 4 can be used to state that those two CGs are to be joined in some way. Similarly, from address maps for CG15, CG7, CG17 and CG6, it can be concluded that:

CG15's PathAddrs 3 & 4 can be used to combine CG21=[Person] and CG14=[:Sue]
CG7's PathAddrs 3 & 4 can be used to combine CG23=[Bus] and CG13=[:*y]
CG17's PathAddrs 1 & 4 can be used to combine CG16=[*z] and CG24=[Train]
CG6's PathAddrs 3 & 4 can be used to combine CG26=[City] and CG12=[Boston]

The next problem occurs when two or more star graphs are being composed by combining common parts. For example, CG2=(Agnt [Go: *x] [Person: John]) (Dest ?x [City: Boston]) (Inst ?x [Bus: *y]) has three references to the label x, indicating that the three instances of [Go] are to be considered the same instance of Going. CG2 has an AddrRange of 12 implying that 12 different primitive parts can be addressed. In particular, 3 of those PathAddr's follow different paths to the same [Go] primitive part:

CG2's PathAddr 3 addresses CG20=[Go] via CG5
CG2's PathAddr 6 addresses CG20=[Go] via CG7
CG2's PathAddr 10 addresses CG20=[Go] via CG6

Thus, CG2 PathAddrs 3, 6 & 10 can be used to combine three different instances of part CG20=[Go].

A DAG path address range indicates, for each part, how many other leaf parts can be reached in the composition network and a DAG path address is a number in an AddrRange that identifies one of the parts that can be reached. Address maps of the node's addressed by the addresses in the node's address range can be easily computed and if needed a table of those maps generated for a DAG.

Figure 23:
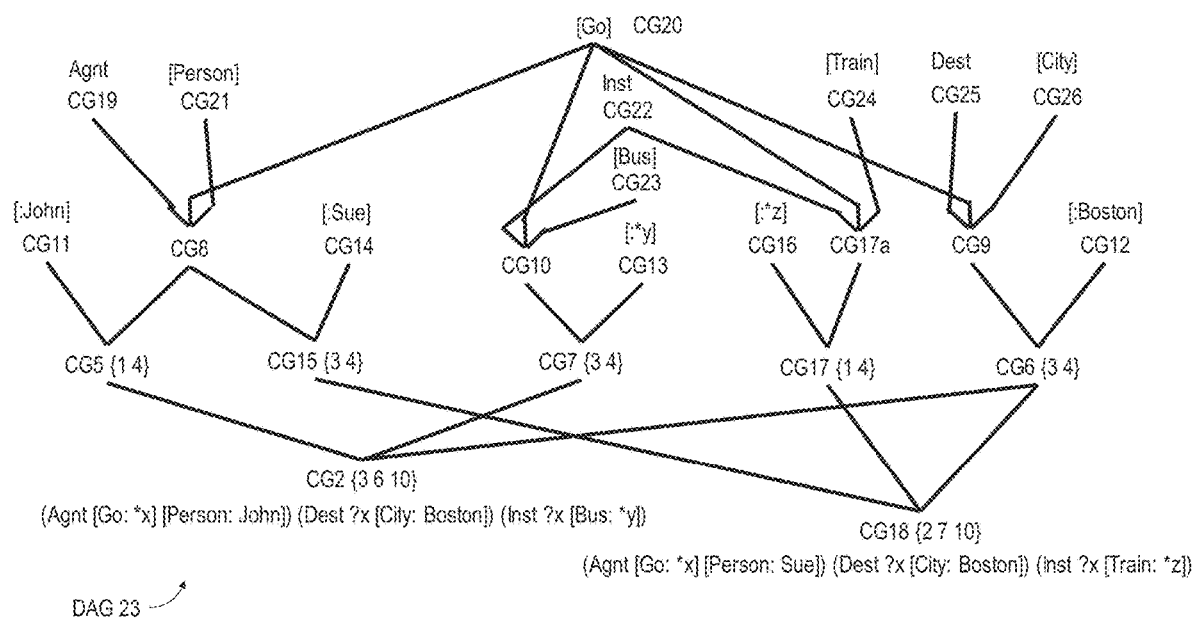
FIG. 23 is a conceptual diagram illustrating an example DAG with binding lists, in accordance with one or more techniques of this disclosure.

FIG. 23 is a conceptual diagram illustrating an example DAG with binding lists, in accordance with one or more techniques of this disclosure. A PathAddr provides a single integer means of identifying a leaf part that can be reached following compositional links. A binding list consists of two or more PathAddr's that are to be joined. Binding lists are denoted like sets {PathAddr . . . PathAddr}. The above examples become:

CG5 {1 4} can be used to join CG21=[:John] and CG21=[Person]
CG15 {3 4} can be used to join CG21=[Person] and CG14=[:Sue]
CG7 {3 4} can be used to join CG23=[Bus] and CG13=[:*y]
CG17 {1 4} can be used to join CG16=[*z] and CG24=[Train]
CG6 {3 4} can be used to join CG26=[City] and CG26=[Boston]
CG2 {3 6 10} can be used to join three different instances of part CG20=[Go]
CG18 {3 7 10} can be used to join three different instances of part CG20=[Go].

These binding lists can be added to the compositional network's parts CG5, CG15, CG7, CG17, CG6, CG2 & CG18 to indicate how parts are to be joined as shown in FIG. 23. (Note that these are bindings based on leaf addressing not binding addressing as described in the next section.)

A compositional network, by itself, only shows which parts are to be composed, not how the parts are composed. Binding lists of PathAddr's provide a means of indicating how parts are to be composed as shown in DAG 23. For conceptual graphs, joining two or more concepts indicates that those concepts are about the same individual. In the display form of CGs, joins are shown as dashed or dotted coreference links. But, here, in a compositional network, joins are indicated by one or more binding lists.

Figure 24:
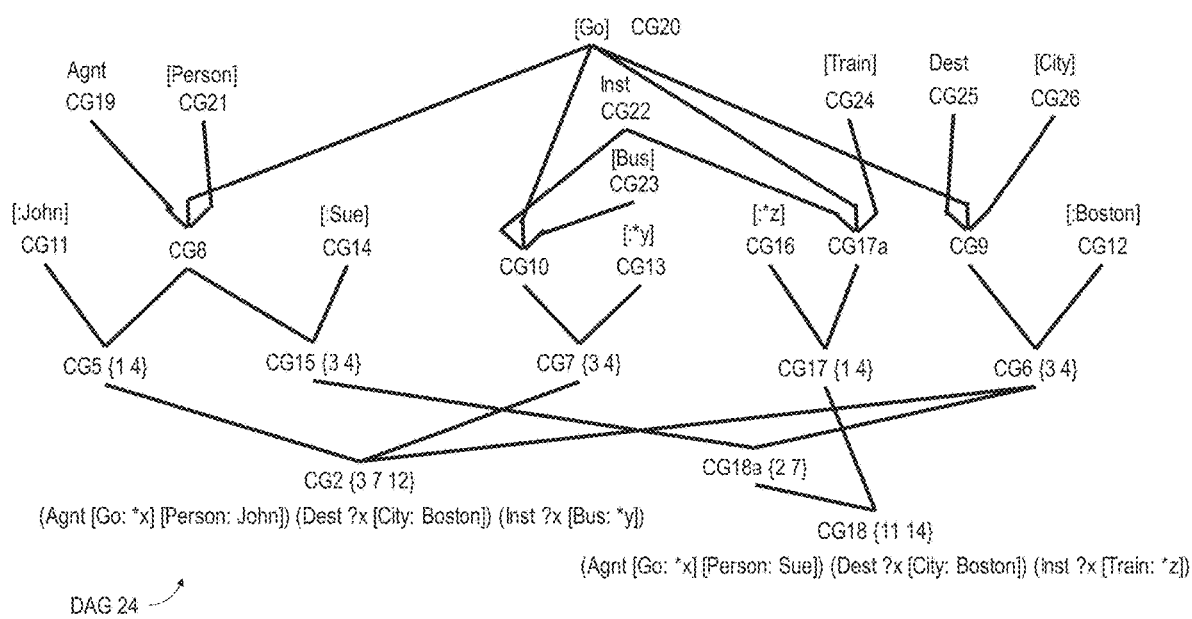
FIG. 24 is a conceptual diagram illustrating an example DAG with binding addressing and hierarchical binding lists, in accordance with one or more techniques of this disclosure.

FIG. 24 is a conceptual diagram illustrating an example DAG with binding addressing and hierarchical binding lists, in accordance with one or more techniques of this disclosure. Some part P1 may require a binding list BL1 to specify how that part's sub parts are to be combined. Part P1 may then be included as a part in a bigger part, P2 and further combining being appropriate. This requires a binding list BL2 for part P2 that can reference P1's BL1. This illustrates the need for hierarchical binding lists; that is, the ability to reference a binding list instead of a part.

This capability is provided by the DAG path addressing's binding addressing. With binding addressing, binding lists are added to the address range by extending the address range's size to include each of that node's binding lists.

AddrRange=the sum of the AddrRanges of a node's parts plus how many binding lists that node has.

The effect is to extend the range of a part's addresses to include the part's binding lists. To provide an example consider CG18:

CG18=(Agnt [Go: *x] [Person: Sue]) (Dest ?x [City: Boston]) (Inst ?x [Train: *z]).

Assume CG18 is constructed incrementally from the first two star graphs and the third added after that.

CG18a=CG15+CG6=(Agnt [Go: *x] [Person: Sue]) (Dest ?x [City: Boston]).

CG18=CG18a+CG17 as shown in FIG. 24 DAG 24.

Because being able to address binding lists changes both some address ranges and their addresses, the table of ranges and addresses for DAG 24 is shown in the below table.

To review, CG18a's binding list joins CG15's [Go] with CG6's [Go] and CG18's binding list joins that binding list to CG17's [Go], resulting in all three [Go]s being joined, as before.

Compositional networks provide a means of representing a set of CGs and their parts and a DAG network of how those parts are composed. Binding lists of part relative addresses (PathAddr's) provide a means of representing how composed parts are combined. Such compositional networks can be used to represent a set of CGs in terms of generic concepts and referents hierarchically composed.

The additional data needed to be stored with (or associated with) each node of the DAG are that node's AddrRange and any binding lists associated with that node. These can be provided as part of each node's data or in separate tables or data structures.

A benefit of compositional networks is that existing parts can be factored out of each new conceptual graph being added. Consequently, the size of the network only grows as fast as the new parts being added, independent of the size of the new conceptual graph A benefit more specific to CGs is the ability to use a combination of leaf and binding addressing to factor names. In the factored form, a DAG path address for each name factored can be added to a binding list along with the DAG path address for where in the CG the name originally occurred. Being able to factor names in this way allows 1)

| | | Address | | | | | | | | | | | | | | | | |
|---|---|---|---|---|---|---|---|---|---|---|---|---|---|---|---|---|---|---|
| Node | Range | 1 | 2 | 3 | 4 | 5 | 6 | 7 | 8 | 9 | 10 | 11 | 12 | 13 | 14 | 15 | 16 | 17 |
| | | | | | | | Node Referenced by Address | | | | | | | | | | | |
| 2 | 16 | 11 | 19 | 20 | 21 | 5:1 | 22 | 20 | 23 | 13 | 7:1 | 25 | 20 | 26 | 12 | 6:1 | 2:1 | |
| 5 | 5 | 11 | 19 | 20 | 21 | 5:1 | | | | | | | | | | | | |
| 6 | 5 | 25 | 20 | 26 | 12 | 6:1 | | | | | | | | | | | | |
| 7 | 5 | 22 | 20 | 23 | 13 | 7:1 | | | | | | | | | | | | |
| 8 | 3 | 19 | 20 | 21 | | | | | | | | | | | | | | |
| 9 | 3 | 25 | 20 | 26 | | | | | | | | | | | | | | |
| 10 | 3 | 22 | 20 | 23 | | | | | | | | | | | | | | |
| 11 | 1 | 11 | | | | | | | | | | | | | | | | |
| 12 | 1 | 12 | | | | | | | | | | | | | | | | |
| 13 | 1 | 13 | | | | | | | | | | | | | | | | |
| 14 | 1 | 14 | | | | | | | | | | | | | | | | |
| 15 | 5 | 19 | 20 | 21 | 14 | 15:1 | | | | | | | | | | | | |
| 16 | 1 | 16 | | | | | | | | | | | | | | | | |
| 17a | 3 | 22 | 20 | 24 | | | | | | | | | | | | | | |
| 17 | 5 | 16 | 22 | 20 | 24 | 17:1 | | | | | | | | | | | | |
| 18a | 11 | 19 | 20 | 21 | 14 | 15:1 | 25 | 20 | 26 | 12 | 6:1 | 18a:1 | | | | | | |
| 18 | 17 | 19 | 20 | 21 | 14 | 15:1 | 25 | 20 | 26 | 12 | 6:1 | 18a:1 | 16 | 22 | 20 | 24 | 17:1 | 18:1 |
| 19 | 1 | 19 | | | | | | | | | | | | | | | | |
| 20 | 1 | 20 | | | | | | | | | | | | | | | | |
| 21 | 1 | 21 | | | | | | | | | | | | | | | | |
| 22 | 1 | 22 | | | | | | | | | | | | | | | | |
| 23 | 1 | 23 | | | | | | | | | | | | | | | | |
| 24 | 1 | 24 | | | | | | | | | | | | | | | | |
| 25 | 1 | 25 | | | | | | | | | | | | | | | | |
| 26 | 1 | 26 | | | | | | | | | | | | | | | | |

In DAG 24 the binding list for CG18a now only has two of the same members as before {2 7}. CG18a's AddrRange is now the sum of the AddrRanges for CG15 and CG6 plus 1 for its own binding list or 11=5+5+1. The AddrRange for CG18 is also different. The AddrRange is now the sum of the AddrRanges for CG18a and CG17 plus that node's own binding list or 17=11+5+1.

CG18's binding list is now {11 14}. The 11 is the PathAddr of CG18a's binding list. The 14 is 3 more than CG18a's AddrRange of 11 so the 14 becomes PathAddr 3 of CG17 which corresponds to CG20 [GO].

the CG to be simpler, 2) the CG to be used with different sets of name binding lists, and 3) processing to be done relative to the simpler CG independent of the names.

Figure 25:
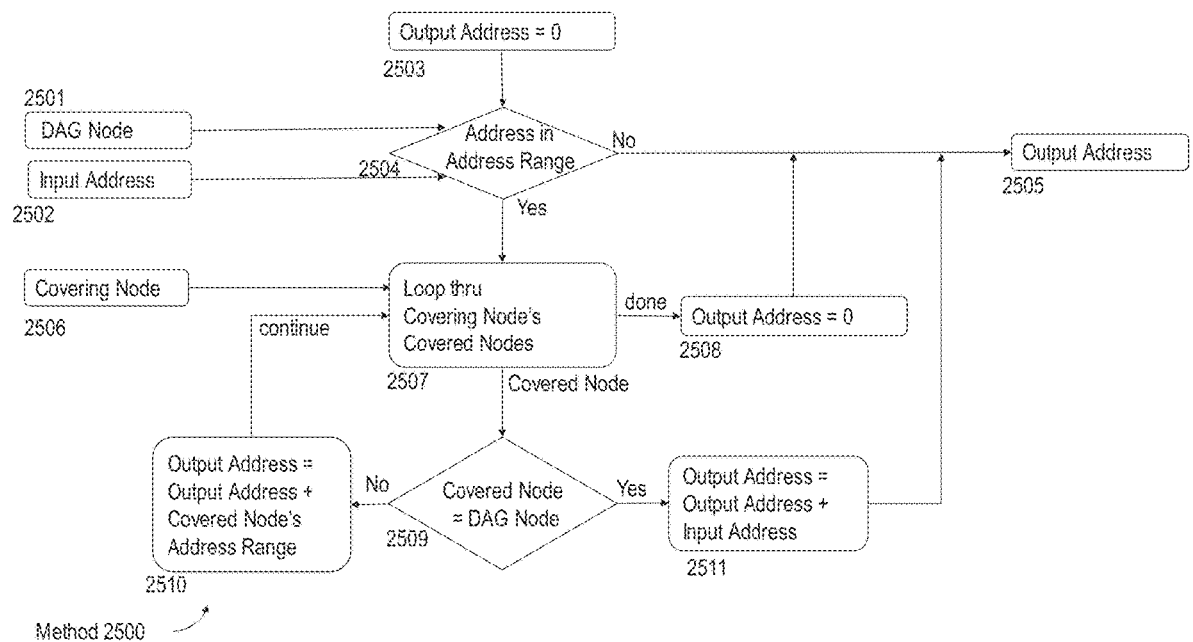
FIG. 25 is a flow diagram illustrating an example method for address propagation to a covering node, in accordance with one or more techniques of this disclosure.

FIG. 25 is a flow diagram illustrating an example method for address propagation to a covering node, in accordance with one or more techniques of this disclosure. Method 2500 may be performed by a processor during the execution of an application, such as processors 240 and application 220 of FIG. 26. As such, "steps" of the method indicate that a processor may be performing the techniques described with respect to that step. DAG address resolution starts with an address and determines the node, leaf or binding that is addressed. DAG address propagation goes in the opposite direction. The propagation starts from a node and a legal address for that node and determines the appropriate address for some covering node to the same node, leaf or binding. While address resolution is recursive in nature, repeatedly resolving each address at the next covered node, address propagation operates one covering node at a time.

FIG. 25 shows Method 2500. The inputs for Method 2500 are a DAG node step 2501, an input address step 2502, and a covering node step 2506. The output address step 2505 is initialized in step 2503 to the value 0. In step 2504, the input address is tested to verify that the input address is within DAG Node's address range. If not (step 2504 No), the current value of the output address is returned by step 2505 as the result of Method 2500.

If the input address is within the DAG node's address range (step 2504 Yes), step 2507 loops through the covering node's covered nodes, causing each to be processed, as indicated by the step 2507 covered node. However, if the loop completes without finding the DAG Node, the output address is set to 0 by step 2508 and that value is returned. This is because, if the covering node does not cover the DAG node, the calculation is an error.

Normally, step 2509 tests if the covered node is the DAG node. If not (step 2509 No), the covered node's address range is added to output address step 2510 and execution continues with the loop step 2507.

The covering node's address range is the sum of those of the covering node's covered nodes. Step 2510 adds the covered nodes up until that for the DAG node is encountered (step 2509 Yes). Then the input address is added to the output address in step 2511 and that becomes the result of Method 2500 step 2505.

Method 2500 can be generalized to a path-based method. Instead of a single covering node input, a path-based version would take as input a list of successively covering nodes. Then the processor would loop over that list and execute Method 2500 for each member of the list, propagating the input address along the list specified path to the last member of the list.

Each node in a directed acyclic graphs (DAG) has a subgraph associated with that node consisting of itself and any nodes that can be reached following directed arcs in the covered nodes direction. In large complex DAGs, it is common for an application to want to do some local processing based on some node's subgraph. In such situations, it is helpful to have an addressing scheme that allows each node, leaf or binding in that subgraph to be addressed.

This can be accomplished by using some form of DAG path addressing. Leaf addressing allows only paths to leaves (or nodes identified as leaves) to be addressed. Subgraph addressing allows any path to any node in a subgraph to be addressed. Binding addressing allows a node's bindings to also be addressed.

All three of these schemes assume a method, like Method 400, that computes an address range for each node in the DAG. The leaves may have an address range of 1. For leaf addressing, the address range is the sum of the address ranges of that node's covered nodes. For subgraph addressing, the address range is this sum+1 for the node itself. And for binding addressing, the address range is this sum plus the number of binding lists the node has.

All three of these schemes assume a method, like Method 600, that resolves a node and address into a path from the node to the addressed node, leaf or binding. Method 600 basically works in reverse to Method 400 by successively stripping off a covered node's address range until the processor finds the one to which the address applies. Method 600 does this by recursively applying Method 500 on a node with an address in that node's range.

DAG path addressing works well in some situations. Because the addresses are dependent on the structure of a node's subgraph, the addresses only depend on that subgraph's structure and are independent of the rest of the graph.

Path addresses are node-relative so the path addresses only depend on that node's subgraph. If a DAG is being added to or edited, as long as a node's subgraph is not involved in the changes, the node's addresses are not affected. Binding lists that use those addresses are not affected and do not need to be updated because of the changes. Conversely, if the structure of a subgraph, including the ordering of the subgraph's arcs are changed, then address ranges, addresses, and binding lists may all need to be updated.

DAG path addressing works well when the number of paths is limited. This is because the number of paths through a large graph grows rapidly with the graph size. The worst case is illustrated by the power set of a set of size n. This is because the number of paths from the node with all members of the set in it to set generator nodes grows as n!. An integer address range and integer addresses quickly get swamped and DAG path addressing becomes impossible. Most real-world applications do not have that path complexity and, consequently, DAG path addressing is applicable, as in the case of conceptual graphs.

Figure 26:
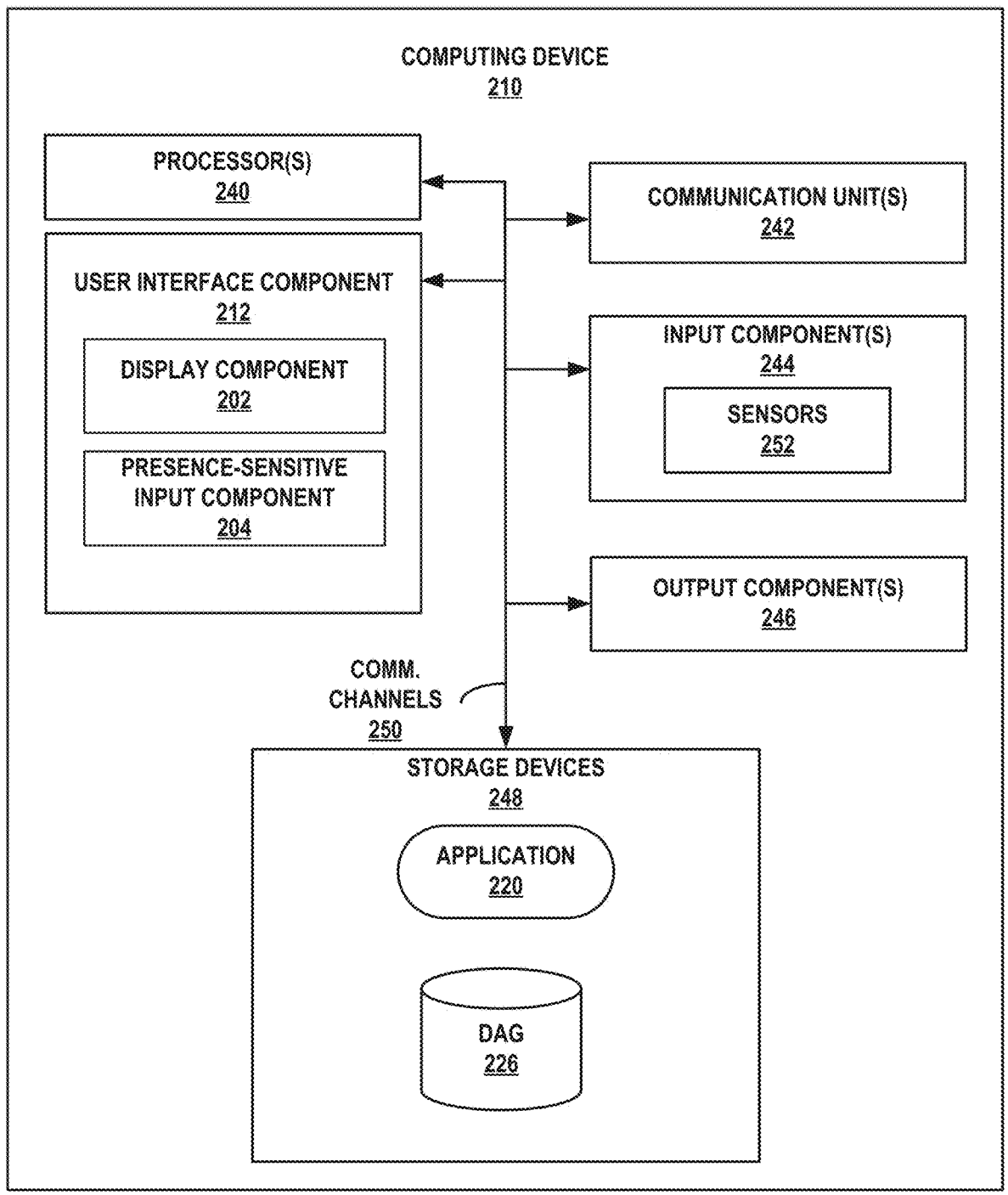
FIG. 26 is a block diagram illustrating a detailed example of a computing device configured to perform the techniques described herein.

FIG. 26 is a block diagram illustrating an example computing device configured to execute an application and store a DAG with addresses created in accordance with one or more aspects of the techniques described in this disclosure. FIG. 26 illustrates only one particular example of computing device 210, and many other examples of computing device 210 may be used in other instances and may include a subset of the components included in example computing device 210 or may include additional components not shown in FIG. 26.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 26, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include application 220 and DAG 226.

One or more processors 240 may implement functionality and/or execute instructions associated with computing device 210 to generate and store DAGS in accordance with the techniques described herein. That is, processors 240 may implement functionality and/or execute instructions associated with computing device 210 to execute application 220 and create/store DAG 226.

Examples of processors 240 include application processors, display controllers, auxiliary processors, one or more sensor hubs, and any other hardware configure to function as a processor, a processing unit, or a processing device. Application 220 may be operable by processors 240 to perform various actions, operations, or functions of computing device 210. For example, processors 240 of computing device 210 may retrieve and execute instructions stored by storage components 248 that cause processors 240 to perform the operations described with respect to application 220. The instructions, when executed by processors 240, may cause computing device 210 to create, store, and manipulate DAG 226.

Application 220 may execute locally (e.g., at processors 240) to provide functions associated with managing DAG 226. In some examples, application 220 may act as an interface to a remote service accessible to computing device 210. For example, application 220 may be an interface or application programming interface (API) to a remote server that manages DAG 226.

One or more storage components 248 within computing device 210 may store information for processing during operation of computing device 210 (e.g., computing device 210 may store data accessed by application 220 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with application 220 and DAG 226. Storage components 248 may include a memory configured to store data or other information associated with application 220 and DAG 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques described herein, storage devices 248 may store DAG 226 for access by application 220 being executed by processors 240 of computing device 210. DAG 226 may include a plurality of nodes stored in storage devices 248. The storage element shown as DAG 226 may store any one or more directed acrylic graphs stored in storage components 248, in accordance with the techniques described herein. Each node of the plurality of nodes may represent a data point within DAG 226. DAG 226 may also include a plurality of directional edges stored in storage devices 248. Each directional edge of the plurality of directional edges may connect a pair of the nodes in the plurality of nodes. Each directional edge of the plurality of directional edges may represent a covering-covered relationship between two nodes of the plurality of nodes. A first node of the two nodes may be a covering node, and a second node of the two nodes may be a covered node.

Each node of the plurality of nodes may further include a subgraph consisting of the respective node and all other nodes of the plurality of nodes reachable from the respective node via a covering path. The covering path may include a sequence of covering nodes and covered nodes. A set of nodes present in the subgraph that do not cover any other nodes may be leaves of the subgraph.

Each node of the plurality of nodes may further include a set of node parameters, the set of node parameters including at least an identifier that uniquely identifies the respective node within DAG 226, and an address range which specifies legal addresses for the respective node. In some instances, the identifier may be a number that uniquely identifies the respective node within the DAG. The address range may include either all paths of the subgraph from the respective node to each leaf in the subgraph, or all paths from the respective node to all other nodes of the subgraph. Each node of the plurality of nodes and the legal address for each respective node specify a cover path within the subgraph for the respective node.

In some instances, DAG 226 may further include binding lists stored in storage devices 248, where the binding lists are based at least in part on the legal addresses for each node of the plurality of nodes. The set of node parameters for each node of the plurality of nodes may include zero, one, or more binding lists whose addresses are legal addresses for that node. In some such instances, the address range may further include all paths from the respective node to each binding list in the subgraph of the respective node. In other instances, the address range may include all paths from the respective node to each of the leaves for the respective node and all paths from the respective node to each of binding list in the subgraph of the respective node. In still other instances, the address range may include all paths from the respective node to all other nodes of the subgraph for the respective node and all paths from the respective node to each of binding list in the subgraph of the respective node.

With DAG 226, processors 240 may execute application 220 to manage, create, or utilize DAG 226. For instance, processors 240 may, while executing application 220, access DAG 226 to compute a desired address range for one or more of the nodes in the plurality of nodes.

In some instances, processors 240 may, while executing application 220, resolve a legal address for a third node of the plurality of nodes to the path specified by the legal address to a target node or a binding list of the target node. In some other instances, processors 240 may, while executing application 220, propagate a legal address for a second node to a legal address for a covering node of the second node that extends the covering path for the second node to the covering node. In still other instances, processors 240 may, while executing application 220, execute a function to indicate that a second node of the plurality of nodes is a leaf node. In still other instances, processors 240 may, while executing application 220, apply bottom-up ordering to DAG 226.

Providing such address ranges for nodes of DAG 226 has multiple benefits. When storing and processing a hierarchy of parts lists (PLs) represented as a DAG, it is a problem to refer to instances of a part type corresponding to a node in the DAG. DAG path addressing in accordance with the techniques described herein provide a way to reference those instances and correlate the instances with the parts or subsystem containing those instances.

Additionally, when storing and processing data-flow diagrams (DFDs), it is a problem that the description of DFDs using the universal modeling language (UML) requires the use of many variable names. This limits the efficiency of both the storage and processing of those stored DFDs. DAG path addressing solves this problem by allowing names to be factored out of the represented DFDs. In the factored form, a DAG path address for each name factored can be added to a binding list along with the DAG path address for where in the DFD the name originally occurred. Being able to factor names in this way allows the DFD to be simpler and used with different sets of names or values, and further allows processing to be done relative to the simpler DFD independent of the names or values.

Further, when storing and processing conceptual graphs (CGs), it is a problem that the description of CGs using the conceptual graph interchange format (CGIF) language requires the use of many variable names. This limits the efficiency of both the storage and processing of those stored CGs. DAG path addressing solves this problem by allowing names to be factored out of the represented CGs. In the factored form, a DAG path address for each name factored can be added to a binding list along with the DAG path address for where in the CG the name originally occurred. Being able to factor names in this way allows the CG to be simpler and used with different sets of name binding lists, and also allows processing to be done relative to the simpler CG independent of the names.

Various methods for analyzing DAGs have been described herein. Additionally, various examples may be performed using various techniques, such as a non-transitory computer-readable medium and/or processor. For example, some examples may comprise a non-transitory computer-readable medium comprising executable instructions that, when executed by a programmable processor causes the programmable processor to perform various methods as described herein. Additionally or alternatively, a system comprising a memory and a processor may be used. In such examples, the memory may comprise data representing one or more DAGs as described herein and the processor may be configured to perform various methods as described herein.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A non-transitory memory for storing a directed acyclic graph (DAG) for access by an application being executed by one or more processors of a computing device, comprising:
   a plurality of nodes stored in the memory, wherein each node of the plurality of nodes represents a data point within the DAG; and
   a plurality of directional edges stored in the memory, wherein each directional edge of the plurality of directional edges connects a pair of the nodes in the plurality of nodes, wherein each directional edge of the plurality of directional edges represents a covering-covered relationship between two nodes of the plurality of nodes, wherein a first node of the two nodes comprises a covering node, wherein a second node of the two nodes comprises a covered node,
   wherein each node of the plurality of nodes further comprises a subgraph consisting of the respective node and all other nodes of the plurality of nodes reachable from the respective node via a covering path, wherein the covering path comprises a sequence of covering nodes and covered nodes, and wherein a set of nodes present in the subgraph that do not cover any other nodes are leaves of the subgraph,
   wherein each node of the plurality of nodes further comprises a set of node parameters, the set of node parameters including at least:
      an identifier that uniquely identifies the respective node within the DAG, and
      an address range which specifies legal addresses for the respective node, the address range further indicating a total number of paths from the respective node to other nodes of the plurality of nodes reachable from the respective node via the covering path; and
   wherein each node of the plurality of nodes and the legal address for each respective node specify a cover path within the subgraph for the respective node.

2. The non-transitory memory of claim 1, wherein the address range includes all paths of the subgraph from the respective node to each leaf in the subgraph.

3. The non-transitory memory of claim 1, wherein the address range includes all paths from the respective node to all other nodes of the subgraph.

4. The non-transitory memory of claim 1, further comprising:

binding lists stored in the memory, wherein the binding lists are based at least in part on the legal addresses for each node of the plurality of nodes.

5. The non-transitory memory of claim 4, wherein the set of node parameters for each node of the plurality of nodes further comprises zero or more binding lists whose addresses are legal addresses for that node.

6. The non-transitory memory of claim 5, wherein the set of node parameters for each node of the plurality of nodes further comprises one or more binding lists.

7. The non-transitory memory of claim 4, wherein the address range includes all paths from the respective node to each binding list in the subgraph of the respective node.

8. The non-transitory memory of claim 4, wherein the address range includes all paths from the respective node to each of the leaves for the respective node and all paths from the respective node to each of binding list in the subgraph of the respective node.

9. The non-transitory memory of claim 4, wherein the address range includes all paths from the respective node to all other nodes of the subgraph for the respective node and all paths from the respective node to each of binding list in the subgraph of the respective node.

10. The non-transitory memory of claim 1, wherein the one or more processors of the computing device, while executing the application, accesses the DAG to compute a desired address range for one or more of the nodes in the plurality of nodes.

11. The non-transitory memory of claim 1, wherein the one or more processors of the computing device, while executing the application, resolves a legal address for a third node of the plurality of nodes to the path specified by the legal address to a target node or a binding list of the target node.

12. The non-transitory memory of claim 1, wherein the one or more processors of the computing device, while executing the application, propagates a legal address for a third node to a legal address for a covering node of the third node that extends the covering path for the third node to the covering node.

13. The non-transitory memory of claim 1, wherein the one or more processors of the computing device, while executing the application, executes a function to indicate that a third node of the plurality of nodes is a leaf node.

14. The non-transitory memory of claim 1, wherein the one or more processors of the computing device, while executing the application, applies bottom-up ordering to the DAG.

15. The non-transitory memory of claim 1, wherein the identifier comprises a number that uniquely identifies the respective node within the DAG.

16. The non-transitory memory of claim 1, wherein each node of the plurality of nodes has a respective type label.

* * * * *